US008452700B2

(12) United States Patent
Williams, III

(10) Patent No.: US 8,452,700 B2
(45) Date of Patent: May 28, 2013

(54) SYSTEMS AND METHODS FOR IMPLEMENTING AN INTEREST-BEARING INSTRUMENT

(76) Inventor: Roger Howard Williams, III, New York, NY (US)

( * ) Notice: Subject to any disclaimer, the term of this patent is extended or adjusted under 35 U.S.C. 154(b) by 0 days.

(21) Appl. No.: 12/768,548

(22) Filed: Apr. 27, 2010

(65) Prior Publication Data
US 2010/0299244 A1      Nov. 25, 2010

Related U.S. Application Data

(63) Continuation-in-part of application No. 10/777,586, filed on Feb. 12, 2004, now abandoned.

(51) Int. Cl.
*G06Q 40/00*      (2012.01)
(52) U.S. Cl.
USPC ............... 705/38; 705/35; 705/36 R; 705/37; 705/39
(58) Field of Classification Search
USPC ................................................. 705/35–39
See application file for complete search history.

(56) References Cited

U.S. PATENT DOCUMENTS

| | | | | |
|---|---|---|---|---|
| 5,742,775 A * | 4/1998 | King | | 705/38 |
| 5,812,988 A * | 9/1998 | Sandretto | | 705/36 R |
| 5,983,206 A * | 11/1999 | Oppenheimer | | 705/38 |
| 6,148,293 A * | 11/2000 | King | | 705/35 |
| 6,185,543 B1 * | 2/2001 | Galperin et al. | | 705/38 |
| 6,269,347 B1 * | 7/2001 | Berger | | 705/38 |
| 6,345,262 B1 * | 2/2002 | Madden | | 705/38 |
| 6,615,187 B1 * | 9/2003 | Ashenmil et al. | | 705/36 R |
| 7,006,992 B1 * | 2/2006 | Packwood | | 705/38 |
| 7,392,216 B1 * | 6/2008 | Palmgren et al. | | 705/37 |
| 7,526,446 B2 * | 4/2009 | Aguais et al. | | 705/38 |
| 7,552,076 B1 * | 6/2009 | Uenohara et al. | | 705/36 R |
| 7,574,396 B2 * | 8/2009 | Kalotay et al. | | 705/37 |
| 7,620,594 B1 * | 11/2009 | Davis et al. | | 705/38 |
| 7,707,101 B2 * | 4/2010 | Misra et al. | | 705/38 |
| 7,801,789 B1 * | 9/2010 | Cohler et al. | | 705/36 R |
| 7,966,256 B2 * | 6/2011 | Liao et al. | | 705/44 |
| 8,065,234 B2 * | 11/2011 | Liao et al. | | 705/44 |
| 2001/0034686 A1 * | 10/2001 | Eder | | 705/36 |
| 2001/0037284 A1 * | 11/2001 | Finkelstein et al. | | 705/37 |
| 2002/0065753 A1 * | 5/2002 | Schloss et al. | | 705/35 |
| 2002/0194094 A1 * | 12/2002 | Lancaster et al. | | 705/35 |

(Continued)

OTHER PUBLICATIONS

"Lenders Try to Spur Owners of Homes to Prepay Old Loans", Wall Street Journal (Feb. 25, 1982).*

*Primary Examiner* — Narayanswamy Subramanian
(74) *Attorney, Agent, or Firm* — Scully, Scott, Murphy & Presser PC

(57) ABSTRACT

Systems and methods are provided that allow a financial instrument to be structured so that the underlying borrowed principal is callable, putable, or both. In one example, a Range Accrual Mortgage is structured so that the underlying borrowed principal is a mortgage that is callable, putable, or both by embedding into the loan structure a rate put option, and by permitting correlative adjustments to the outstanding loan principal. The invention lends symmetry to the interest rate behavior of certain borrowings by making explicit the pricing and market value of options that were previously only implicit in the borrowing structure. For example, a mortgage in accordance with the invention should provide incentives for either the homeowner or the bank to refinance the mortgage and should do so whether interest rates rise or fall, and no matter what path interest rates follow from the inception of the instrument until its maturity.

12 Claims, 21 Drawing Sheets

U.S. PATENT DOCUMENTS

| | | | |
|---|---|---|---|
| 2003/0093347 A1* | 5/2003 | Gray | 705/35 |
| 2003/0093351 A1* | 5/2003 | Sarabanchong | 705/36 |
| 2003/0105696 A1* | 6/2003 | Kalotay et al. | 705/35 |
| 2003/0110122 A1* | 6/2003 | Nalebuff et al. | 705/38 |
| 2003/0120568 A1* | 6/2003 | Chacko et al. | 705/35 |
| 2003/0135448 A1* | 7/2003 | Aguias et al. | 705/38 |
| 2003/0135450 A1* | 7/2003 | Aguais et al. | 705/38 |
| 2004/0019560 A1* | 1/2004 | Evans et al. | 705/40 |
| 2004/0088247 A1* | 5/2004 | Grant et al. | 705/38 |
| 2004/0128227 A1* | 7/2004 | Whipple et al. | 705/38 |
| 2004/0153384 A1* | 8/2004 | Whipple et al. | 705/35 |
| 2004/0162862 A1* | 8/2004 | Hull et al. | 708/160 |
| 2004/0267674 A1* | 12/2004 | Feng et al. | 705/400 |
| 2005/0065871 A1* | 3/2005 | Gerhart et al. | 705/38 |
| 2005/0080706 A1* | 4/2005 | Birle et al. | 705/37 |
| 2005/0108028 A1* | 5/2005 | Arehart | 705/1 |
| 2005/0114259 A1* | 5/2005 | Almeida | 705/38 |
| 2005/0137956 A1* | 6/2005 | Flory et al. | 705/37 |
| 2005/0216384 A1* | 9/2005 | Partlow et al. | 705/35 |
| 2005/0288910 A1* | 12/2005 | Schlessinger et al. | 703/2 |
| 2009/0099959 A1* | 4/2009 | Liao et al. | 705/38 |
| 2010/0185467 A1* | 7/2010 | Strnad, II | 705/4 |
| 2011/0022541 A1* | 1/2011 | Miles et al. | 705/36 R |
| 2011/0047058 A1* | 2/2011 | Erbey et al. | 705/35 |
| 2011/0251945 A1* | 10/2011 | Liao et al. | 705/38 |
| 2012/0084196 A1* | 4/2012 | Capozza | 705/38 |

* cited by examiner

SYSTEMS AND METHODS FOR IMPLEMENTING AN INTEREST-BEARING INSTRUMENT

BACKGROUND OF THE INVENTION

Under current market practice, some interest-bearing instruments generate asymmetric price changes in response to interest rate changes. For example, there would be a financial incentive for a homeowner to refinance a mortgage were the market interest rate for mortgages to fall: upon refinancing, the homeowner's monthly payments would be adjusted downward. However, there would be no financial incentive for the homeowner to refinance a mortgage were the market interest rate for mortgages to rise.

In part, this asymmetric behavior is driven by current market pricing and structuring conventions under which some implicit embedded options in borrowing instruments are recognized and priced, while other implicit embedded options are either not considered, not priced, or not priced properly.

It is well known that certain interest-bearing instruments are difficult to construct, price, and hedge. For example, the pricing response of mortgage-backed securities ("MBS") is known to reflect both economic and non-economic market factors. (As used herein, "MBS" may refer to one or more mortgaged-backed securities.) Economic factors that affect pricing may include, among other things: the right to buy the underlying debt obligations back from the creditor; the historical interest rate at the inception of the underlying obligations; the current market interest rate for substantially similar obligations; the debtor's degree of indebtedness; and the value of the underlying collateral (if any). Non-economic factors that affect pricing may include, among other things: the debtor's consumption preferences for the intrinsic value of the housing received at spot (i.e., current market interest rate) through the borrowing of money versus the value of the money to be foregone at a later time via interest and principal repayments.

In particular, the price/yield response of MBS or other similar collateralized instruments may reflect embedded and implicit call options within the collateral underlying the MBS. These call options allow the debtor (such as a homeowner) to buy the underlying loan back from the creditor (such as a bank). Because debtors are allowed to repay the face value of the outstanding balance of the underlying borrowing at par at any time prior to the nominal maturity, MBS, from the investor's perspective, are subject to prepayment or contraction risk (shortening of nominal tenor). Market participants recognize that the debtor's ability to repay the underlying borrowing at any time is impliedly equivalent to the debtor being long a call option to buy back the outstanding face value (i.e., the remaining book value) of the borrowing at any time, while the creditor is understood to be, impliedly, short that same call option.

In consequence, in a declining interest rate environment, the owner of an MBS (which bundles callable loans together into one security) may have the tenor of his MBS shorten dramatically. If the tenor of his investment shortens because the underlying collateral is called away, the MBS investor must reinvest his funds at lower rates of interest. Because the MBS investor is not protected against falling rates, the MBS investor does not have the protection afforded by an interest rate floor ("IRF"). An IRF is typically struck at a level, "X", to insure against revenue losses that would be generated by interest rates dropping below X. If interest rates drop, the owner of the IRF option will collect, approximately, the present value of the difference between the strike rate X and the new lower interest rate multiplied by the notional amount of the IRF. Thus, declining interest rates generate losses for any investor who is not long an IRF. To phrase the matter in the inverse sense, any investor not long an IRF is, impliedly, short an IRF and thus unprotected in the event of interest rate declines; any investor in a callable security is short an IRF and, in consequence, experiences revenue losses generated by declining interest rates.

The MBS investor's implied short IRF is equivalent to a short (impliedly sold to the debtor on the underlying collateral) one-touch or barrier knock-out option struck at the original contract rate: when rates drift or diffuse or jump below the original contract rate (touch or pass through or transit the barrier), the MBS investor's option on the MBS yield (at the original contract level) is knocked out or negated when homeowners exercise their long call on the underlying collateral. When that implied short IRF option knocks out, the MBS investor experiences tenor contraction risk, and is free to reissue securities at the lower market level; but, in consequence, earns a lower rate of return on his new investments.

Because the existence of the implicit call option is generally accepted, market pricing dynamics explicitly calculate the value of MBS instruments (constructed from underlying instruments, generally residential mortgages or whole loans) inclusive of the call option, even though those securities only implicitly carry this callability. It is well understood that lower levels of market interest rates will provide the underlying debtors with an incentive to buy back and to refinance their borrowings, whereas higher market interest rates will usually create a disincentive for the underlying debtors, absent non-economic ("irrational") reasons, to buy back and refinance the borrowings or loans at uneconomic (higher) interest rates.

It would be advantageous to provide systems and methods that would permit taking the market pricing convention (inclusive of the implicit call option) currently used and extending that pricing methodology to include other aspects of the underlying instrument's embedded, implied optionality in order to allow an instrument to be retired, in whole or in part, or extended in tenor, in whole or in part, and/or adjusted as to rate, in whole or in part.

Additionally, it would be advantageous to improve current interest-bearing instruments—and indeed the pricing of all market loan instruments—by moving them closer to full compliance with the hoped-for parity equivalence expected of arbitrage-free markets. While not arbitrage-free, such improved instruments would represent a more efficient trading vehicle for consumers, hedgers, and speculators in interest-rate markets, no matter what the nature of the instrument, and whether or not the product is attached to a related or underlying aggregation of collateral.

It would further be advantageous to create or manufacture an interest-bearing instrument such that, no matter what the level of current interest rates relative to the interest rate levels at the time of original instrument issuance, the instrument more accurately reflects the value to the debtor and the creditor of taking a "view" relative to: 1) the current/spot expected term structure of forward interest rates (spot-forwards); and/or 2) the expected forward evolution of the forward term structure of interest rates (forward-forwards). Such forward "views" should reflect the expected probabilities of: rate neutrality, rate decreases, and rate increases.

SUMMARY OF THE INVENTION

The present invention allows a financial instrument to be structured so that the underlying borrowed principal is callable, putable, or both. In a preferred embodiment, a Range Accrual Mortgage ("RAM") is structured so that the underlying borrowed principal is a mortgage that is callable, putable, or both by embedding into the loan structure a rate put option ("RPO"). Preferably, this is accomplished via the following steps:

A) If the average forward-forward rate, from the time of the RPO valuation, through the remaining nominal term of the contract, is greater than the original (time zero) contract rate, then B) set the new contract rate equal to that average forward-forward rate, net of, if such a charge is called for under the RAM variant being analyzed, an adjustment for the annuitized value of the RPO; and C) set the loan adjustment, subsequent to the RPO exercise, equal to the difference between:
  1) the present value of the remaining initial mortgage cash flows present-valued at the average of the forward-forward rates; and
  2) the present value of the remaining initial mortgage cash flows present-valued at the initial contract rate which was set at time zero.

This invention lends symmetry to the interest rate behavior of certain borrowings by making explicit the pricing and market value of options that were previously only implicit in the borrowing structure. For example, a mortgage in accordance with the invention should provide incentives for either the homeowner or the bank to refinance the mortgage and should do so whether interest rates rise or fall, and no matter what path interest rates follow from the inception of the instrument until the maturity of the instrument. The invention achieves the desired advantages, in part, by extending the characteristics of a borrowing via the addition of a rate put option on an interest rate and, in part, by permitting correlative adjustments to the outstanding loan principal.

The invention permits a hitherto unquantified aspect of price behavior the embedded RPO and its consequent sensitivity to a changing interest rate regime—to be made explicit, quantified, and used to correctly price instruments formerly deficient in this regard. This change in embedded optionality is linked directly and causally to fluctuations of the underlying borrowed principal in response to fluctuations in market interest rates.

The invention provides systems and methods for implementing a structured financial instrument that augments the allowable set or trading set of interest-bearing instruments. In other words, the invention augments the function-space (i.e., the set of functions used for calculations) within which the value of interest-bearing instruments is calculated. In the most generalized context, the creditor conveys value to the debtor at one point in time ("spot"), and is repaid a value at a later point in time ("forward"). The time difference between spot and forward may, if necessary for mathematical or computational purposes, be considered to approach zero, or be "instantaneous." Further, while the unit of value conveyed may be in units of some national (sovereign) or notional currency (change of numeraire), the units of exchange or trade may be in any form that stores value during the time that will elapse between the spot and forward dates. The values conveyed may, or may not, be securitized or collateralized by other units of either spot or forward value.

The invention further provides systems and methods for structuring an interest-bearing instrument, the pricing of which is not fully or correctly market-based, so that it becomes more fully market-based. This invention prices interest-bearing borrowings with consistency, under a parity construct, relative to other such instruments. Pricing under conditions of parity will not ensure arbitrage-free pricing, but will ensure that instruments that share a common underlying function-space are priced consistently relative to each other. This invention also permits hitherto unrecognized, implicit options to be identified and made explicit (if such treatment is desirable), and appropriately prices those instruments in the context of the implied parity between: underlying instruments; options and other options; options and cash; or any combination of the foregoing.

The invention further provides both the structure of the enhanced optionality embedded in the contemplated borrowing structure (including the trade-offs formed between the new and enhanced embedded options) and the enhanced underlying cash flows of the related borrowings. Numerous other advantages will be apparent to those of skill in the art.

In a preferred embodiment of the invention, an interest-bearing instrument in the form of a borrowing is created that may be offered in one or more of the markets where spot and forward value are exchanged. The instrument offered is unconstrained regarding whether or not the rate of interest paid/received represents a "fixed" or "floating" rate of interest at inception, and whether or not the instrument contains embedded within it options sold to or purchased from either or both the debtor and the creditor. The embedded options offer to either or both parties the ability to change the terms of the exchange of values during the nominal tenor or nominal life of the aggregate instrument or instrument package.

In another preferred embodiment, a method for enabling market-based pricing of a financial instrument comprises the steps of:
(a) a debtor selling to a creditor an instrument evidencing borrowing of a principal;
(b) the creditor selling to the debtor a call option to repay the principal, or a portion thereof, early relative to the original maturity;
(c) the debtor selling to the creditor a rate put option (RPO);
(d) the debtor receiving the value of the RPO as well as the right, if market-interest rates have changed and the debtor's call option has been exercised, to have the debtor's principal adjusted to reflect the debtor's absorption of new market-interest rates (i.e., spot-forward and/or forward-forward interest rates);
(e) the debtor paying an initial stated level of interest to the creditor (the interest, whether paid or received, may be quoted or stated with any compounding convention);
(f) the creditor giving the debtor the option to retire any amount of the principal at any time;
(g) the debtor selling to the creditor the right for the creditor to cause the debtor to pay, in the future, an interest rate that is different from the interest rate payable at the instrument's inception; and
(h) if the creditor exercises the right to cause the debtor to pay a different interest rate than that originally contracted for, the debtor receiving an adjustment to the principal.

In other preferred embodiments, computer-based systems are used to enable market-based pricing of a financial instrument in accordance with the invention.

In another preferred embodiment, a computer-implemented apparatus for facilitating issuance of an interest-bearing instrument includes a memory and a computer processor in communication with the memory. The computer processor executes functions including: receiving data corresponding to market factors; storing the received market factors data in a database; selecting an option model and related parameters; receiving data corresponding to regression model parameters; receiving data corresponding to prepayment model parameters; receiving data corresponding to interest rate term structure model parameters; receiving data corresponding to default term structure parameters; receiving data corresponding to transaction indicative details; normalizing received and stored data; calculating prepayment probabilities; calculating a forward term structure; calculating discount factors; calculating a default term structure; calculating an option value from the option model using the prepayment probabilities, the forward term structure, the discount factors, and the default term structure; and calculating a principal modification value based on the option value.

DETAILED DESCRIPTION OF THE PREFERRED EMBODIMENTS

Figure 1A:
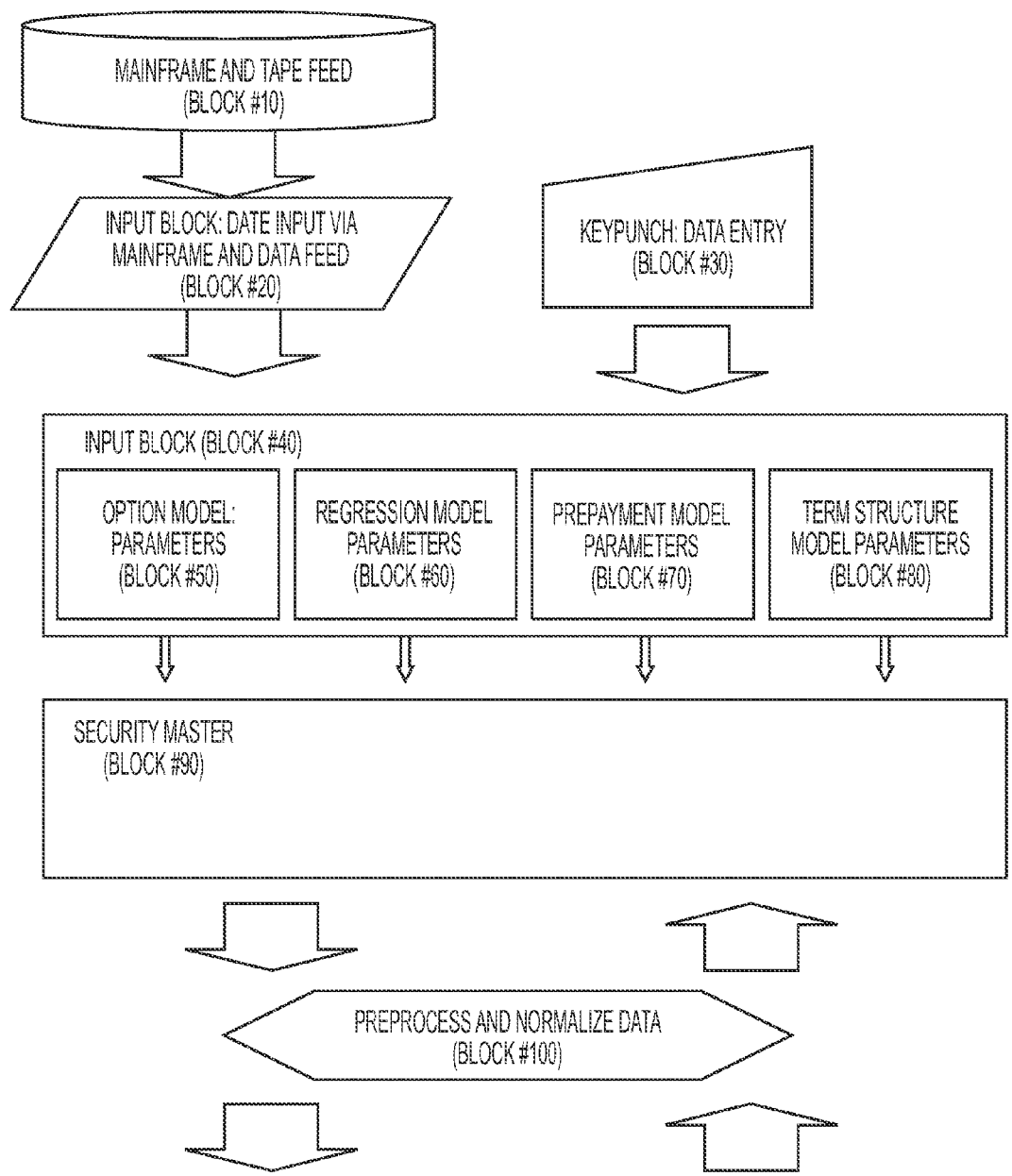
FIG. 1 is a flowchart of software that may be used in a system for providing a RAM product according to the present invention.

Considered mathematically, the right to buy an interest-bearing instrument allows the creditor to require of the debtor repayments of principal and interest that may equate to the payment of, in the aggregate: positive interest, zero interest, or negative interest. While the zero and negative interest cases are uncommon, they do occur in the market and will be considered for the sake of completeness. Currently, interest-bearing instruments—including, for example, residential and commercial mortgages and automobile loans—may reflect the conventional right to retire the borrowing using the implied embedded call option:

as interest rates decline, the value of instruments that are priced inversely thereby tend to rise, and tend to be positively convex in the price/yield range that is outside of the range of rates under which the call option might (most probabilistically) be exercised; and inside of the range of rates that includes the highest probability of option exercise, the price/yield relationship of those instruments may be adjusted by the value of the implied embedded call option and may tend to become negatively convex.

The present invention uses an implicit right granted to the debtor to sell a put on the interest rate—a rate put option ("RPO")—to the creditor in order to change the price/yield relationship of the instrument relative to the price/yield behavior evinced by existing instruments. A key preferred embodiment of the invention is a new mortgage structure. That structure is called a range accrual mortgage ("RAM"), which has embedded within it a rate put option. The RAM is further defined below.

An RPO, by contractual agreement between debtor and creditor, is an option that may be exercised upon one or more types of interest rate (or asset that proxy or index one or more of the rates selected). The RPO, which the debtor sells to the creditor, gives the creditor the right to require of the debtor (subject to the condition that the RPO is exercised, as that term in understood by those skilled in the art) that the initial contract-interest-rate level at time-zero be replaced by the strike-interest-rate level embedded in the RPO. By agreement, this event will occur when the strike-interest-rate level is less than or equal to a selected index. Also by agreement, the strike-interest-rate level will use an underlying reference index.

The underlying index may be, but is not limited to: 1) a spot interest rate; 2) a spot-forward interest rate; 3) a forward-forward interest rate; 4) the projected evolution of a term-structure of interest rates; or any combination of the foregoing items #1-3. The description of the preferred embodiments below may refer to one or more of the foregoing types of interest rate underlying the RPO, as dictated by the specific context. However, those skilled in the art will realize that these are preferred embodiments only and that the nature of the underlying interest rate may take practically an infinite number of forms. Thus, in any given context the nature of the interest rate used below should be considered illustrative, and thus neither exhaustive nor definitive.

For any implicitly or explicitly callable interest-bearing instrument, under standard concepts of parity, because the debtor may own an unexercised call on the instrument, the debtor is implicitly long a complementary put on the rate (an RPO): as rates rise and outstanding bonds become less valuable, by choosing not to call the instrument back (which would allow the creditor the opportunity to force the debtor to issue a new, higher-interest-rate instrument), the debtor can force the creditor to remain long (i.e., earn) a below-market interest rate. The debtor is thereby allowed implicitly, to put a below-market rate to the creditor, and should be able to explicitly price and sell this RPO to the creditor if the debtor wishes to do so.

For example, when the interest-bearing instrument is a mortgage, because the homeowner implicitly owns an unexercised call option on the mortgage, he implicitly owns a complementary put option on the interest rate (an RPO): as rates rise and outstanding mortgages become less valuable to the bank, by choosing not to call the mortgage back (which would allow the bank to issue a new, higher-interest-rate mortgage), the homeowner can force the bank to retain ownership of a below-market interest rate instrument. The homeowner owns an RPO, and should be able to sell this RPO to the bank if he wishes. Such a mortgage in accordance with the present invention is called a Range Accrual Mortgage (RAM). The present invention imputes value to this RPO and provides an incentive to a debtor (such as a homeowner), through the initial contracting process, to sell that RPO to a creditor (such as a bank). Since the debtor is long the RPO, the creditor is short; if the debtor is long an option, the debtor may be able to negotiate with or contract with the creditor to have the creditor buy the RPO from the debtor.

In a preferred embodiment, the implicit RPO is made explicit via a sale by the debtor to the creditor of a put on the current and forward levels of interest rates. Sale of the RPO by the debtor to the creditor may be monetized or implemented via one of several methods: 1) an adjustment to the debtor's loan rate; 2) an adjustment of the debtor's loan principal; or 3) a combination of rate adjustment and loan adjustment.

If only the debtor's loan principal is adjusted, such an adjustment would: 1) create equity for the debtor through a borrowing reduction; 2) reduce the probability of debtor default; 3) allow the creditor to reduce his balance-sheet exposure to underwater borrowings (i.e., loans issued at historical contract rates below current and/or expected forward rates) as interests rise; and 4) eliminate creditor extension risk as to both the underlying collateral, and as to any MBS instruments constructed thereon.

If only the debtor's loan rate is adjusted, such an adjustment would: 1) provide the debtor with income increase (or expense reduction); and 2) reduce the debtor's forward probability of defaulting due to a forward absorption of an unmanageable increase in forward payments due to increased interest rates.

An interest-bearing instrument may be defined using the below notation and formulae:

| Symbol | Definition |
| --- | --- |
| V | Value of loan at some time "t" |
| L | Loan Principal at some time "t" |
| CF | Cash-Flow: a) may be single flow or aggregate of flows occurring at various times "t"; b) may be spot or forward dollars; c) may be principal, or interest, or both; |
| $R_f$ | Forward Rate: may or may not be inclusive of time scalar |
| $R_k$ | Contract Rate: may or may not be inclusive of time scalar |
| "t" | A given time which may be: time-zero, maturity, any time in between time-zero and maturity |
| T | The time of nominal maturity: for an individual cash flow, or for the instrument in its entirety |
| A → B OR A ← B | A implies B; or B implies A; or an assignment statement resulting from a computation. |
| * | Operation of multiplication |
| $\sum_{i=*}^{i=*}$ | Operation of summation |
| $(\#)^{-i}$ | Operation of exponentiation where "#" is an argument |
| "A\|B" | Given, or conditional on the occurrence of "B", then assume that "A" occurs or exists. |

The Generic Loan Calculation

A generic fixed-rate loan, which is neither callable nor putable, is typically re-valued so that the value to the debtor at some time "t" is equal to:

$$V_t = \sum_{i=1}^{i=T} -CF_i^* (1 + R_{k_0})^{-i} \tag{0}$$

Stated in words, the value of a non-callable and non-putable loan at any time "t" is determined with reference to: 1) a remaining Cash Flow (CF) or collection of Cash Flows (CF); 2) a deterministic interest rate (i.e., fixed contractually, and therefore known with complete certainty, at time-zero); and 3) a time period over which interest is to be calculated (the time scalar is embedded in $R_{k_0}$ for each time period considered).

The principal to be repaid and periodic interest are both computed (both of which are, without differentiation or distinction, represented by $-CF_{remaining}$), then present-valued to time "t". A fixed rate mortgage loan is simply a bundle of these agreements (i.e., $-CF_{remaining}$ is composed of a number of cash flows, as indicated by the sigma notation, not just one cash flow), whereby the creditor loans a lump sum to the debtor and the debtor pays back the principal plus interest (P&I) monthly with a sequence of cash flows.

Mortgages exhibit a small computational wrinkle in that interest is front-loaded, and principal repayment is back-loaded. Notwithstanding the market convention that mandates the back-loaded repayment of principal, principal is always stated in spot dollars and as a remaining notional amount or percentage of the original face amount of indebtedness. The exponential discount factor used above in equation (0) is assumed to be derived from the spot discount factor applied to either: 1) a risk-neutral zero coupon bond maturing at the same time as the maturity of the cash flow that is to be discounted (viz., "t=T" for both the given cash flow and its related discount factor), or 2) a risky zero coupon bond maturing at the same time as the maturity of the cash flow that is to be discounted (viz., "t=T" for both the given cash flow and its related discount factor). The nature of the zero-coupon bond discount factor to be used must be determined in the context of the credit-risk imposed upon the creditor by his acceptance of the underlying credit profile of the debtor.

The Fixed-Rate Mortgage Loan Calculation: Rising Rate Environment

Mortgage loans, by market convention, are typically underwritten in such a fashion that the implied relationship below holds:

$$V_t = \sum_{i=1}^{i=T} -CF_i^* (1 + \min(R_{k_0}, \bar{R}_{f_t}))^{-i} \tag{1}$$

Where, in a standard or conventional mortgage loan not subject to a mark-to-market process, $[\bar{R}_{f_t} > R_{k_0}] \rightarrow [R_{k_0}]$: that is, impliedly, if the average forward rate is greater than the contract rate at inception, then, set the rate to be used for both accruals (embedded in "–CF" via the initial contract) and discounting equal to the initial contract rate. Therefore, in the rising rate state of the world, equation (1) for a standard mortgage uses the initial contract rate and ignores the average forward-forward rate (computed at any time "t") when the average forward-forward rate is greater than the contract rate. That is, neither the accrual rate nor the discounting rate will be adjusted to reflect rates that are greater than the initial rate(s) contracted for.

Further, in a standard or conventional mortgage loan, Loan Size, represented by "–CF" above in equations (0) and (1) and by "L" below in equation (2), is conditional at each moment in time on a comparison between the initial contract rate and the average of forward-forward rates:

$$[L_{remaining} = L_{remaining} | \bar{R}_f > R_k] \tag{2}$$

Stated in words, conditional on the average forward-forward rate being greater than the initial contract rate, the remaining loan principal will not be adjusted.

The Fixed-Rate Mortgage Loan Calculation: Falling Rate Environment

However, if the average forward-forward rate is below the contract rate, $[R_{f_t} < R_{d_0}]$, equation (1) is conditional on a comparison between the contract rate at inception versus the market rate at any time "t" in that the cash flows represented by the old loan are set equal to zero:

$$[L_{old}=0|R_k>\overline{R}_f] \quad (3)$$

Stated in words, the old loan value, impliedly, is allowed to go to zero conditional on the original rate embedded in the contract being greater than the average of the forward-forward rates. Under the conditional equation (3), equation (1) is still used for revaluations, but the factor represented by −CF is reset to zero pending refinancing. Then the refinancing is done by issuing a new mortgage, and the quantity −CF is reset equal to the remaining level of indebtedness carried over from the initial mortgage, and the new interest rate is fixed equal to a market rate of interest $[\overline{R}_{f_t}<R_{k_0}] \rightarrow [\overline{R}_{f_t}]$ for both accruals and discounting.

The Mortgage Loan Calculation: Results for Creditor and Debtor

Under these implied relationships, forward-forward rates evolve in a nondeterministic fashion (i.e., one does not know, at spot, what forward-forward rates will be) such rates may be equal to, greater than, or less than either the spot rate or the spot-forward rates. Further, because they are uneconomic to the debtor, it is assumed that forward-forward rates greater than the initial contracting rate are considered (for calculational purposes) to constitute the maximum of the set Max $\{R_f, R_k\}$. Thus equation (1) is interpreted such that the forward rate is ignored (because using the minimum is equationally required) and the initial contract rate, as the minimum of the set, is used for both accruals and discounting. That is, when rates rise: 1) the contract rate is fixed, and is not changed to reflect higher accruals; and 2) because mortgages are typically not marked-to-market, the higher rate for discounting forward flows is not used.

Conversely, if the initial contract rate is above the average forward rate at a forward time not equal to zero (i.e., the date of the original contract initiation), then the contract will be voided, and the initial loan amount will go to zero under the conditional equation (3); simultaneously, a new loan will be written at the average then-current contract rate, which will be assumed to be the average of the expected forward-forward rates.

As a result of the conjunction of equation (1) and the related conditional statements concerning the average forward rate, rising rates are punitive to the creditor, while falling rates benefit the debtor.

The Mortgage Loan Calculation: the RAM (One Embodiment)

The below conditional statement is inherent in the standard mortgage structure:

$$[L_{old}=0|R_k>\overline{R}_f] \quad (4)$$

In a preferred embodiment, a RAM in accordance with the invention recognizes, first, that equation (4) implies that the loan value specified in equation (5) below is callable (i.e., not marked to market) in a context of declining rates, and that neither the accrual nor the discounting rates are constants:

$$V_t = \sum_{i=1}^{i=T} -CF_i^*(1+\min(R_{k_0},\overline{R}_{f_t}))^{-i} \quad (5)$$

Because the loan underlying a standard mortgage is impliedly callable at the borrower's option, the rate used for both accruals and discounting should be the minimum of the set below when the average forward-forward rate drops below the contract rate:

$$\min\{\overline{R}_{f_t}, R_k\} = \overline{R}_{f_t}|[\overline{R}_{f_t}<R_{k_0}] \quad (6)$$

Additionally or correlatively, the RAM recognizes that, according to equation (2), the second conditional:

$$[L_{remaining}=L_{remaining}|\overline{R}_{f_t}<R_k] \quad (2)$$

implies that the loan is, but should not be, a constant whenever average forward-forward rates exceed historical contract rates, and recognizes that this second conditional creates an asymmetry in the mortgage market: typically, borrowers do not ask to pay a higher loan rate when rates increase. Exercising into a higher loan rate is typically done for un-economic reasons (e.g., bankruptcy, mandatory sale, or relocation), and is typically described as "irrational exercise" in that it decreases the debtor's wealth by: a) absorption of refinancing costs; or b) absorption of higher monthly payments through absorption of higher interest rates.

In sum, the classical fixed-rate mortgage looks less like a loan, and more like a bundle of callable forward rate agreements that, by virtue of their callability in a declining rate environment only, create an asymmetry between debtor and creditor. A RAM attempts to bring symmetry to the market by adding putability to the standard loan contract. The interest rate, in some variants of the invention (e.g., a double-barrier RAM variant), may be allowed to conditionally float within a range specified by the contracting parties. In one preferred form of the invention, the rate does not float automatically as does a variable rate mortgage (i.e., it is not an obligation, as is imposed by a forward rate agreement); rather, the rate floats at the whim of the debtor (optionally, and when rates drop) and at the whim of the creditor (optionally, and when rates rise).

Note that traditional variable rate mortgages, in contradistinction to the RAM, create several hidden and mandatory—not optional—jeopardies in a rising rate environment:

if rates are quite volatile, the lifetime cap on the rate may be invoked after a rapid rate rise, and the variable rate may convert to a very high and very punitive (to the debtor) fixed rate;

a rate that is punitive to the debtor, may become punitive to the creditor as well, if the debtor is forced into default thereby;

before capping at a fixed rate, the increasingly higher rates under a variable rate structure may lead to negative amortization, or increases in the underlying loan principal; such a process is equivalent to the debtor, without even realizing it, having sold at contract inception an additional loan-principal-put (not a rate put or RPO) to the creditor above and beyond his initial loan amount; in other words, "L" may become "L+A" where "A" is an additional loan amount not originally forecasted or bargained for by the debtor at loan inception; and rate increases under a standard variable rate product, unlike under the RAM product, are:

not readily subject to the debtor's control (mandatory action, not optional action); and may not adequately compensate the debtor for absorbing the additional probabilistic danger of rate increases (are not fairly priced from the perspective of the debtor).

The Variable-Rate Mortgage Loan Calculation: a Comparison

It is useful to understand the present invention by considering a conventional variable-rate mortgage, which may be analogized to the below relationship:

$$L_{t_0} = \sum_{i,f,k,t} -CF_i^*(R_{k_0}+(R_{f_t}-R_{k_0}))*(1+R_{f_t})^{-i} \quad (7)$$

Note that equation (7), because it includes a contract rate and a market rate, looks like a bundle of forward rate agreements that, when revalued via the spread difference between the contract rate and any forward rate, may create either an additional asset or a liability for either party above and beyond what was originally contracted for (c.f., "L+A" described above):

A) if, in (7), $R_f = R_k$, the market interest rate charged to debtor, though variable, appears to be "fixed";
B) if, in (7), $R_f > R_k$, then the debtor will pay the initial contract rate plus a positive spread; and
C) if, in (7), $R_f < R_k$, then the debtor will pay the initial contract rate plus a negative spread;

Thus a variable rate mortgage is a pure, and contractually mandatory, speculation on rates. As such, the equation (7) looks like a variable rate mortgage: rising rates punish the debtor and falling rates punish the creditor. But the above structure does not take into account either the callability or putability of rates. As such, the characteristics of a standard mortgage, whether fixed-rate, with the above conditionals (as in equations (0)-(3)), or floating-rate (equation (7)) are structurally deficient as to the measurement and timing of the value of the rate movements (expressed as either a call or put option delta), which would be embedded into the principal adjustment under a RAM structure in accordance with the invention.

Further, if it were the convention in a standard mortgage that a mark to market process be used, such a process would be a one-time event with implications for retaining or terminating the original contract. In contrast, an embedded option structure does not, or may not, require exercise of those embedded options. Options, which are not exercised, continue to provide an ongoing insurance value to the long holder. Thus, options can afford the option owner a mode of decision making (as to timing) that an arbitrary mark-to-market process does not.

It should be noted that a RAM according to the instant invention creates a direct correlation between option exercise and interest rates. A simple mark-to-market product (e.g., a fixed-rate mortgage, or a variable rate mortgage where the debtor does not optionally control the level of interest paid, or the outstanding principal owed, or the remaining tenor) may require the debtor to: 1) pay a higher monthly payment; 2) provide more equity (in the form of cash); 3) assume a larger level of indebtedness; or 4) accept a different interest rate at an inopportune time. In consequence, a variable-rate mortgage revaluation for a mark-to-market product must be artificially and directly correlated with debtor liquidity or the debtor's credit rating at the time of revaluation. Likewise, for a variable-rate mortgage, periodic caps may either: a) mitigate the yearly increase in interest, which must be paid due to rising rates, or; b) mitigate the amount of negative amortization experienced, but the changes of the accrual and discounting rates and the changes to the amortization are not linked via a joint valuation process and are not reflected back as a reductive adjustment to the loan principal, as under the RAM.

It should also be noted that, unlike the RAM, other products may also require that the debtor make a decision between two portfolios: 1) being long a consumption portfolio (owning a house, car, boat, etc.); or 2) being long a larger amount of cash, but short the consumption item (house, car, boat, etc.).

The RAM: Other Preferred Aspects

By allowing liquidity and consumption decisions to be decorrelated relative to individual investor preference, various embodiments of the RAM product may beneficially reduce decision making relative to: 1) decisions as to how much spot and forward interest rate risk to absorb; 2) how or when to upgrade the debtor's credit standing via the correlative principal adjustment; 3) how or when to monetize increases in debtor equity.

Thus a conventional mortgage structure is deficient in that it does not measure debtor preference, and also does not compensate debtor preference. By contrast, under standard arguments of risk neutrality, the RAM does not need to measure debtor preference in that it fairly compensates for rate changes. Nevertheless variants of a RAM that will be apparent to skilled artisans would allow debtors to express preferences under conditions other than under risk-neutrality rather than simply waiting for an optimal exercise opportunity under, assumedly, conditions of risk-neutrality.

A RAM is structured so that the underlying mortgage may be either callable, or putable, or both. In a preferred embodiment, an RPO is embedded into the structure, via the below steps A)-C), such that an appropriate charge for the RPO may be assessed against the then current market rate (if the RPO value is annuitized under the particular structure):

IF: $\overline{R}_{f_t \to t+n} > R_{k_0}$ →

Stated in words, if the average forward-forward rate is above the original contract rate, then follow steps A), B) and C);

A) Set $R_{k_{new}} = \overline{R}_{f_t \to t+n}$

Stated in words, the new contract rate for the remaining nominal contract tenor is set equal to that average forward-forward rate (a significant and conditional change to equation (1) that exists under the standard mortgage).

In addition to step A) above, in step B), adjust the outstanding loan principal using equation (8) below:

$$B)\ L_{adjust} = \sum_{i=t}^{i=t+n} -CF_i^*[(1+R_{k_{new}})^{-i} - (1+R_{k_0})^{-i}] \quad (8)$$

Stated in words, set the loan principal adjustment equal to the difference between principal and interest (described, without distinction/differentiation, as cash flows or as −CF) discounted at the new average forward-forward rate, versus the principal and interest discounted at the original contract rate.

In step C), use equation (9) to revalue the loan using both the new rates set in step (A), as well as the loan adjustment from step B), where step B) takes step A) as an input:

$$C)\ V_t = L_{old} + L_{adjust} \quad (9)$$

Stated in words, the value of the loan at any time "t" is equal to the value of the old loan plus a loan adjustment.

In one preferred embodiment of the invention, the above three steps accomplish the following:

1) an RPO, sold at inception to the creditor by the debtor, is exercised;
2) as a result of the RPO exercise, a new contract rate is struck between the creditor and debtor at the exercise or strike rate specified in the initial contract;
3) the debtor and creditor agree to:
   a) reset the loan interest rate to the RPO strike rate; and
   b) discount the remaining originally calculated cash-flows at the new discount rate determined by the strike rate of the RPO;
4) the remaining balance of the loan is calculated such that:
   a) the monthly payment on the new loan is equal to the monthly payment on the original loan; and b) the new loan principal is equal to the present value (at the new rate) of the remaining-originally-contracted monthly cashflows; in the alternative,
c) the loan principal adjustments may be greater than, equal to, or less than the original book value;
d) the loan principal adjustments may or may not equate to an exact mark-to-market based upon current market rates (evolution of the forward-forward term structure or contractual terms may move the mark away from market);

5) the value of the RPO that is sold by the debtor to the creditor may be paid for by the creditor making an adjustment to:
   a) loan principal; and/or b) the contract rate; and/or
   c) the monthly scheduled payments.
   d) In some of the cases above, the sale of the RPO may have the practical implication of reducing the creditor's original short call option position;
   e) In all of the cases above, the loan adjustment is more sophisticated than a simple mark-to-market ("MTM") of the spread-value between the original contract rate and the exercise rate: the loan adjustment is linked to the expected evolution of the forward-forward term structure, as well as the delta structure embedded in the totality of options embedded in the RAM;
   f) The dynamic re-pricing of the principal indebtedness which is provided by the embedded optionality will reduce the need, in many cases, for refinancing; in such instances, the RAM will lead to significantly lower transaction costs, while offering many benefits;
   g) Benefits to dynamic re-pricing:
      (i) Either a voided initial contract (based upon an interest rate drop), or an MTM might imply transaction costs (i.e., the need to re-close the loan consequent to a rate drop; the need to MTM the loan as rates rise might imply re-closing or a transfer of cash);
      ii) To the extent that the RAM impounds benefits via the option valuation, and to the extent that the contracting parties agree that wealth transfers can be observed, measured and recorded without a new document, and to the extent parties agree not to exercise but to retain the insurance value impounded in a live (unexercised) option, transaction costs will be saved;
   h) Because the rate payment increase required of the debtor is, in one preferred variant, exactly offset by the reduction in loan principal, there should be no tax consequences to the transaction at spot (though there may be forward timing differences);
   i) Forward income timing differences generated by the option revaluation process may be created by any differences that occur between forward-forwards (as calculated at spot), and forward-forwards as they roll into spot at future times and are realized through the transfer of cash or other value. However, such timing differences occur in any contract revaluation that is revalued via the forward rate or forward price market; and
   j) Unlike a variable rate loan, acceptance of a higher rate, when offset by principal reduction, does not lead to any of the bad consequences associated with a variable rate loan: 1) a higher monthly payment; 2) negative amortization; 3) the potential "fixing" of a punitively high fixed rate for the remainder of the loan term; 4) a combination of the foregoing.

Note that rising rates under the RAM structure reduce the value of the MBS investor's implicit short call option on the underlying indebtedness or collateral, and increase the value of an RPO. Note also that the RAM imputes a rational value to both the RPO pricing and the RPO's delta. In consequence, the initial implied call option, which the creditor is short, should be more accurately priced. Thus rising rates will lead to a reduction in the creditor's short call option delta, and an increase in his long RPO delta.

One example of a RAM might have the following characteristics:
  the debtor and creditor enter into a mortgage loan agreement in the amount of $250,000 for 30 years; with the documentation for the mortgage being substantially similar to a standard agreement except for financial details;
  the mortgage requires the debtor to pay a fixed rate of interest, for example, 5%;
  embedded within the mortgage is an RPO sold by the debtor to the creditor; and
  the details of the RPO are as follows:
    by assumption, a strike rate of 8% is set—the strike rate is 300 bps above the initial or at-inception contract rate;
    by assumption, the volatility of the underlying rate-process, 30-year mortgage rates, is set at 12% per annum;
    by assumption, prepayments will occur on the mortgage at a rate determined by a prepayment model (which is known to skilled artisans) that may impound or be reflective of, inter alia, the following regression factors:
      the 30-year mortgage rate;
      the coupon of the underlying mortgage; and
      the age of the underlying mortgage.

As an example, a RAM with the above characteristics may have the following values:

| Descriptor | Value | Explanation/Description |
| --- | --- | --- |
| Corresponding Spread | 16.3 bps | Annualized RPO Cost: in bps of original principal |
| Option Value | $12,531 | Present Value of 16.3 bps (annualized over original nominal loan term) |
| Loan Amount | <$250,000> | Amount Borrowed |
| Current Rate | 5.00% | Assumed Initial Contract Rate |
| Strike Rate | 8.00% | Level at which RPO is exercisable |
| Annual Volatility of Rates | 12.00% | Assumed annual rate movement |
| Term | 30 years | Original or nominal contract term: (i.e., before prepayments and repayments and adjustments) |
| Frequency | 12 | Frequency of mortgage payments is monthly |

-continued

| Descriptor | Value | Explanation/Description |
|---|---|---|
| New Principal Amount | <$182,899.82> | Principal subsequent to exercise of option, and subsequent to principal adjustment |
| Prepayment Life | 14.45224 | Remaining nominal tenor, in years, of remaining loan principal given prepayment model assumptions |
| Monthly Payment | <$1,342.00> | Amount of monthly mortgage payments, both before and after option exercise (under this variant of the RAM product) |

In this example:

Corresponding Spread, approximately 16.3 basis points (1 basis point=0.01%), is the annualized option cost;

Option Value (in dollars)=(Loan Amount)*(Corresponding Spread)*(Term);

the actual option value is the cumulative loss that the option writer may expect (based upon conditional exercise and conditional prepayment) to experience over the life of the loan, as calculated via a selected pricing model (one of innumerable pricing models that skilled artisan could select), and is equivalent to, roughly, 5.0124% of the original principal, or ($250,000*0.050124)=$12,531;

Prepay Life, under the model assumptions, is no longer the original nominal 30 years, but 14.45 years; and New Principal Amount is <$182,899>.

The result of the above transaction is as follows:

the debtor, at inception, owes <$250,000> principal plus the interest on the amortizing principal payable over a nominal 30 year life;

the debtor owns an implicit long call option that allows the debtor to exit the contract in the event that rates decline; and the debtor, in addition to standard features above, sells to the creditor an RPO, which is 300 bps out of the money at inception.

Upon option exercise by the creditor the following occurs:

when mortgage rates are 300 bps or more above the initial contract rate, creditor exercises the long option, which causes the debtor to pay off the mortgage at the new contract rate of 8%;

Mortgage payments are held flat at the original monthly cash-flow level; and in consideration for paying the remaining mortgage principal at a new contract rate of 8%, the creditor gives the debtor relief from a portion of the remaining underlying principal indebtedness.

Among the practically infinite possible permutations for structuring a RAM (or other instrument in accordance with the invention) that those of skill in the art will recognize are:

the types of option structures that may be used to create the RPO are practically infinite;

the prepayment model and its parameters may vary;

the debtor's ability to prepay after rate declines may or may not be limited under some structures;

the interest-rate-diffusion model used to calculate forward rates may be the Heath-Jarrow-Morton model, or may vary under a specific vendor's implementation of the RAM product (e.g., pure diffusion or jump diffusion);

the debt relief offered to the debtor can range from $0 to the entirety of the original loan principal (assuming no leverage);

the new contract rate to be charged may be 0% to infinity (mathematically speaking, the variations may be almost unlimited);

the resulting monthly payment amount may be unchanged or may vary;

the subject loan may be of any type (not just residential mortgage) and principal and interest payments—at inception, at the time of any interim adjustments, and at loan liquidation—may take any form (e.g., cash, in-kind, or shares);

the rate domain over which rational exercise is possible for the long option holder may be extended; and the rate domain over which exercise may be considered to be irrational may be either reduced, or priced more fairly for both the long and short option holder.

Rate calculations may be performed with the Heath-Jarrow-Morton ("HJM") model, which is a generalized term structure model. However, the model that is used may be diffusion, jump-diffusion, mixed diffusion, or any other vendor implementation of a generalized term-structure model.

With regard to computer-based systems that may embody or that may be used with embodiments of the invention (including the RAM), skilled artisans will recognize that given the state of the art in personal computing relative to microprocessor speed, software, and architecture, the pricing and implementation of the present invention, may be implemented on what is commonly referred to as a personal or home computer. In one preferred embodiment of the invention, the implementation of the invention in a financial institution context, it is anticipated that a valuation of a portfolio (more than one position) comprising multiple instances of the invention, especially with regard to term structure modeling, would require significant computing power. In such a preferred embodiment, while the software algorithms used for such valuation would not differ in form from that implemented on a personal computer, the computer used for such valuations preferably should be of the commercial or mainframe type, possessing correspondingly greater computational power, and possessing correspondingly greater storage capabilities. As skilled artisans will appreciate, systems that may embody or may be used with the invention may be implemented with a wide variety of hardware (including processors, memories, storage devices, and storage media), software (including operating systems, databases, and Web-based applications, configurations (including a single unit, multiple units, networks, and client/server arrangements), and other elements.

Figure 1B:
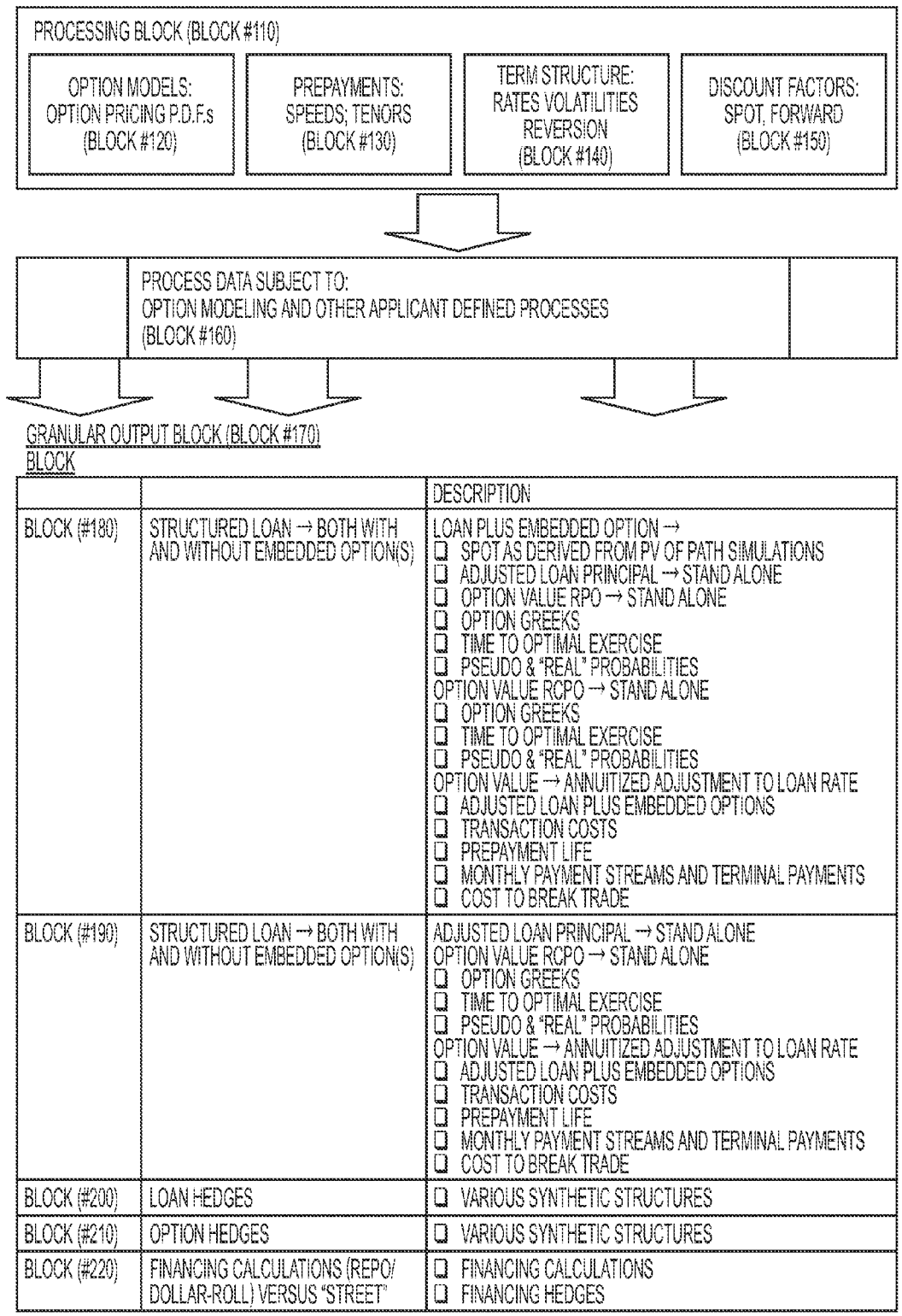
Figure 1C:
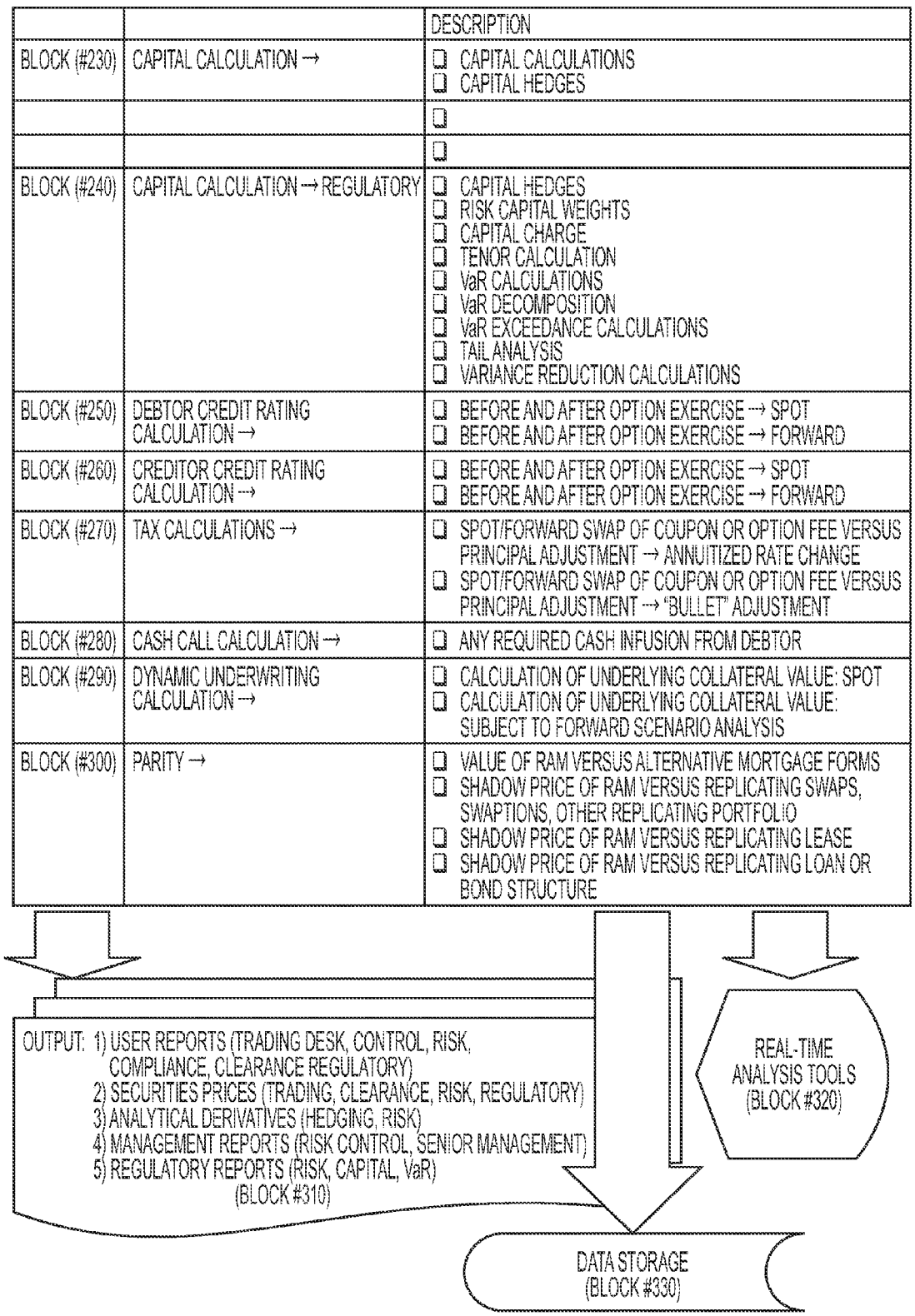

FIG. 1 shows a flowchart of one example of software that may be used in a system that provides a RAM product. As shown in FIG. 1a, both vendor (possibly tape fed) and keypunch data are gathered into mainframe storage in blocks #10-#30. Likewise, block #40, with sub-blocks #50-#80, is used to gather model parameters for the prepayment, regression, term-structure and option models. These parameters are gathered and stored in the security master (block #90). The security master preferably summarizes and stores: mainframe data; data feeds from vendors; keypunch data; security-indicative data; and pre-calculated values for interpolations and surfaces. The security master also preferably contains static security descriptors. Block #100, is the preprocessing module, which block is used to normalize data formats and convert units of measure to be used in the processing block. As shown in FIG. 1*b*, block #110, including sub-blocks #120-#150, is the location used for calculating inputs into the selected pricing model, inter alia: volatilities, discount factors to be applied to cashflows, prepayment speeds. Block #160 is the core of the processing mechanism. In Block #160, the selected model for pricing option-embedded loans and the related sensitivities are calculated. As shown in FIG. 1*b*-1*c*, output block #170, with sub-blocks #180-#300, contains all the data that is to be used by a user of the invention, such as a broker, in order to price securities and derive any related sensitivities for the purposes of hedging or risk management. As shown in FIG. 1*c*, output blocks 4310-#330 are used by those implementing the invention to gather, analyze, and store pertinent security information. The information in these blocks is used for pricing, hedging, management reporting, risk reporting, and regulatory reporting.

The System Environment

Figure 2:
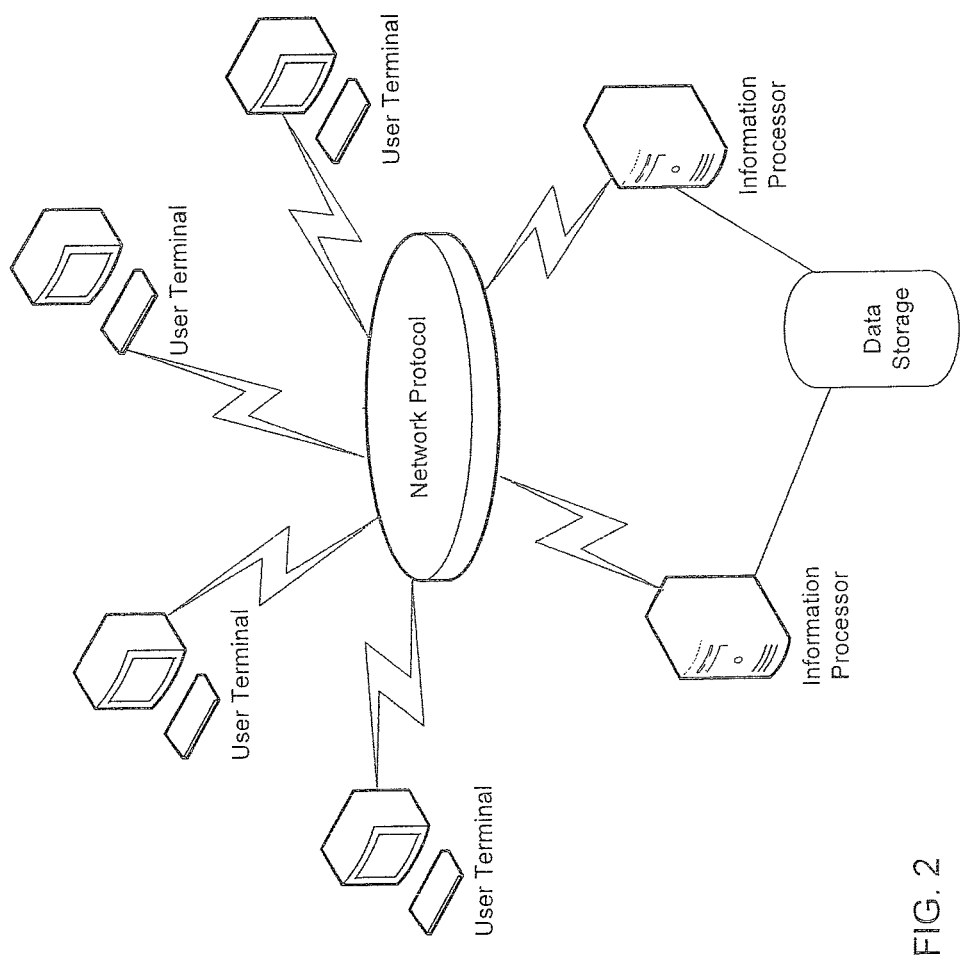
FIG. 2 is a schematic diagram of a preferred computer system according to the present invention.

In another preferred embodiment, all the hardware and software elements previously described are provided in multiple in quantities. For example, as shown in FIG. 2, any number of monitors, each displaying a GUI, may be accessed by users in any number of remote locations. Those remote locations can be networked by a network protocol (e.g., UNIX, HTML, XML, AJAX) to one or more servers or server farms. Each server farm may contain many hundreds of computer blades, containing many thousands of processing cores. Each processor may be used to calculate one (or more) instances of the invention. Embodiments of the invention may be implemented in any computer language (e.g., Visual Basic, FORTRAN, COBOL), but the C++ programming language is preferred.

Figure 3:
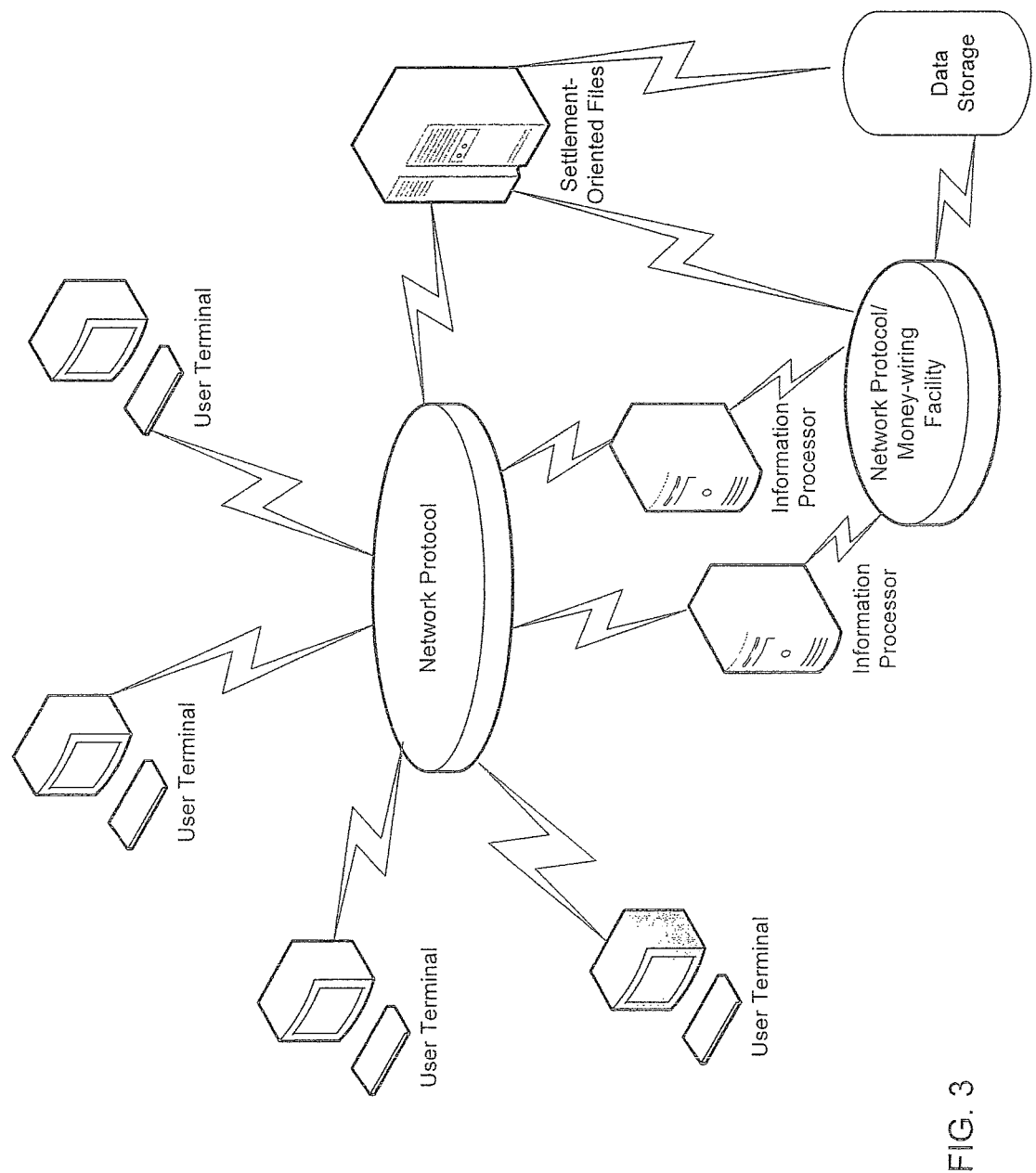
FIG. 3 is a schematic diagram of another preferred computer system according to the present invention.

The time-transformations of principal and interest here described represent unique (mathematically speaking) and repeatable events in the system's ALU or CPU (block #160). These time-transformations are represented by output expressed in dollar and rate magnitudes that are completely repeatable and predictable, conditional on the repeated input of the original parameters (block #110). Such dollar amounts are then booked into a database (block #330) or repository for record-keeping purposes, and the underlying dollars to which all of the subject calculations are attached may be moved or transmitted by yet another network or money-wire facility linked to the physical hardware and software by mediating hardware and software (block #310) as well as the additional system elements depicted in FIG. 3. The rates that correspond to the foregoing dollar amounts are also stored and then transmitted to the debtor and creditor as a basis for further calculations or negotiations. Other users may access the stored parameters and calculations for the purposes of renegotiation, trade cancellation or correction, or for calculating risk management and hedging information (block #290).

Terminal and Browser

User terminals may be "smart" or "dumb" terminals that are networked using a standard network interface with attached protocols and that are invoked by the user for data input (block #20, block #30). For example, Microsoft's Internet Explorer, Netscape's Communicator, or any of the various application tools from Google may be used. Users approach the system with a distinct point of view ("POV"). Given the user's authenticated status and POV, various screens reflecting various grades and levels of system functionality are made available (block #30).

Browser Initiation and Utilization

Figure 4:
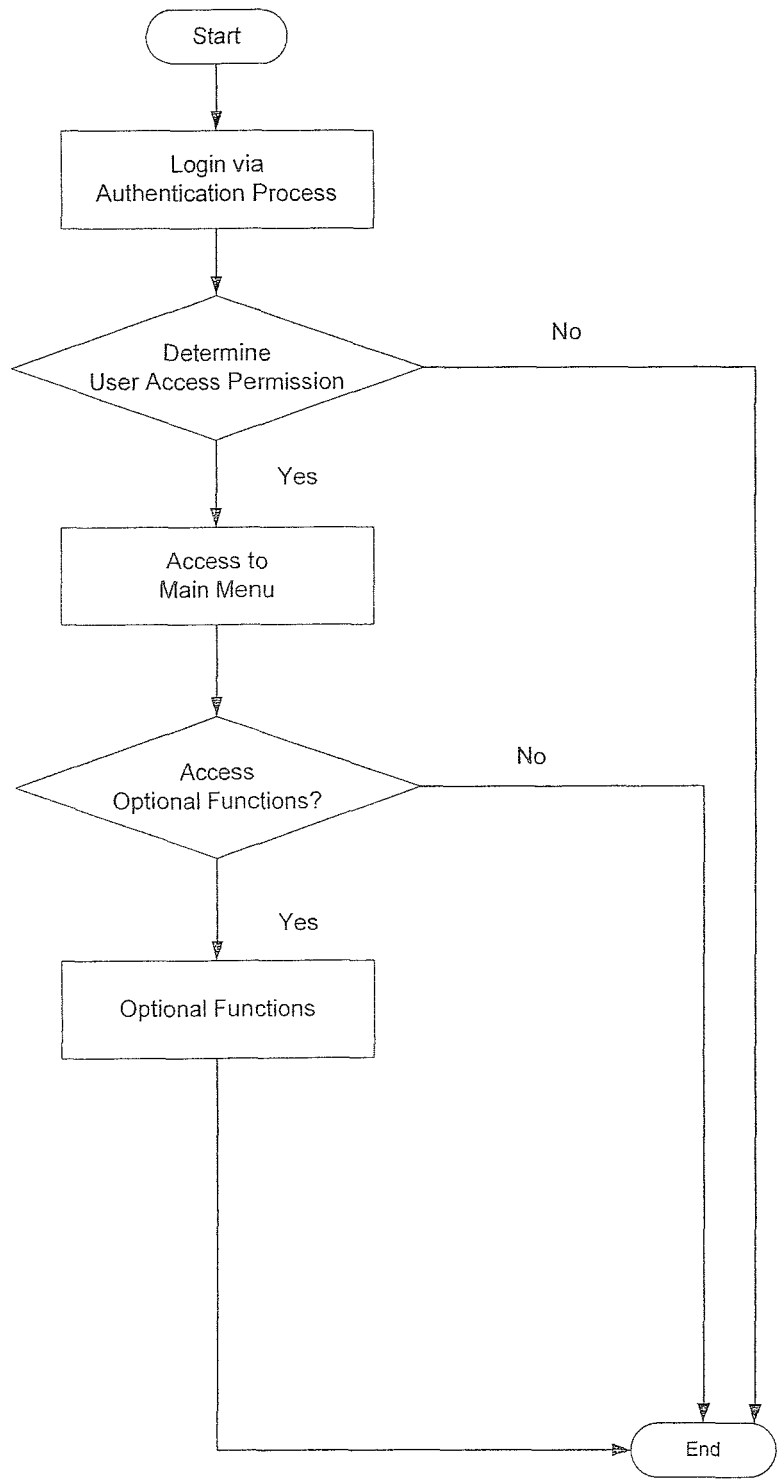
FIG. 4 is a flowchart of an overall architecture for the software of FIG. 1.

The user initiates a web browser. The user must login via an authentication process. User access is permissioned at various levels of functionality based on user security clearance. Some users have "read only" access, some users have "write-only" access, some users have "super-user" or "root" access. Some users may be permissioned to create accounts with various permission restrictions. Once authenticated, the user gains access to a main or "home" page that contains all the system sub-functionality for data input or invocation of various functions (FIG. 1 block #30, further detailed in FIG. 4.)

Figure 5:
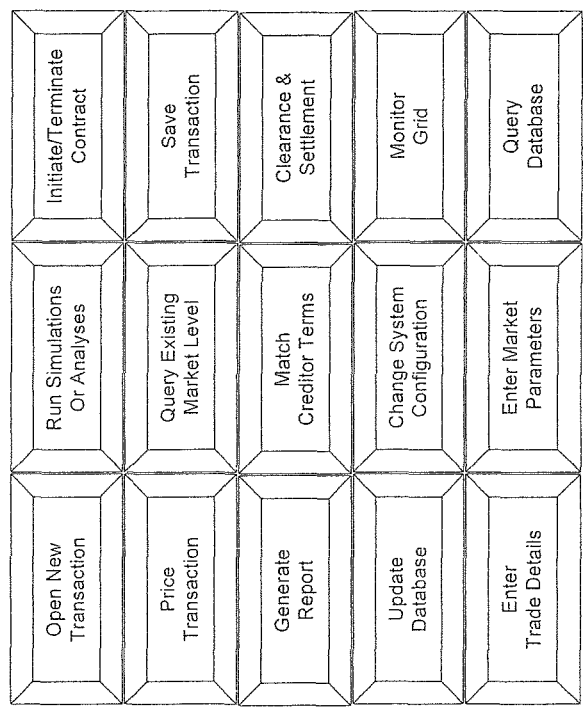
FIG. 5 is an example of a main menu in FIG. 4.

The required main sub-functionality modules or objects include the ability and authority to: open a new trading transaction; price a transaction; generate a report for re-pricing an instrument to update a transaction; simulate conditions which would lead to a match between users aspirational levels for market clearing prices and rates; query existing market pricing levels for similar debt products; determine if there is a match with creditor terms; engage in a transaction which allows either the initiation or termination of a debt contract; commit the transaction to the database for storage; commit a transaction to the clearance and settlement (block #310); as well as well as the system elements found in FIG. 5.

Optional sub-functionality (block #310) includes the ability to: generate a report for risk measurement, financing, or hedging purposes; calculate trade liquidations or assignment; determine the levels of market parameters embedded in that market pricing; query the database; invoke a transaction template; and modify a prior trade (block #30, block #330).

Those skilled in the art will recognize that the foregoing lists of required and optional functions are suggestive and not wholly inclusive of the functions that might be available to a given user.

User Data Entry: Utilization Details

Figure 6:
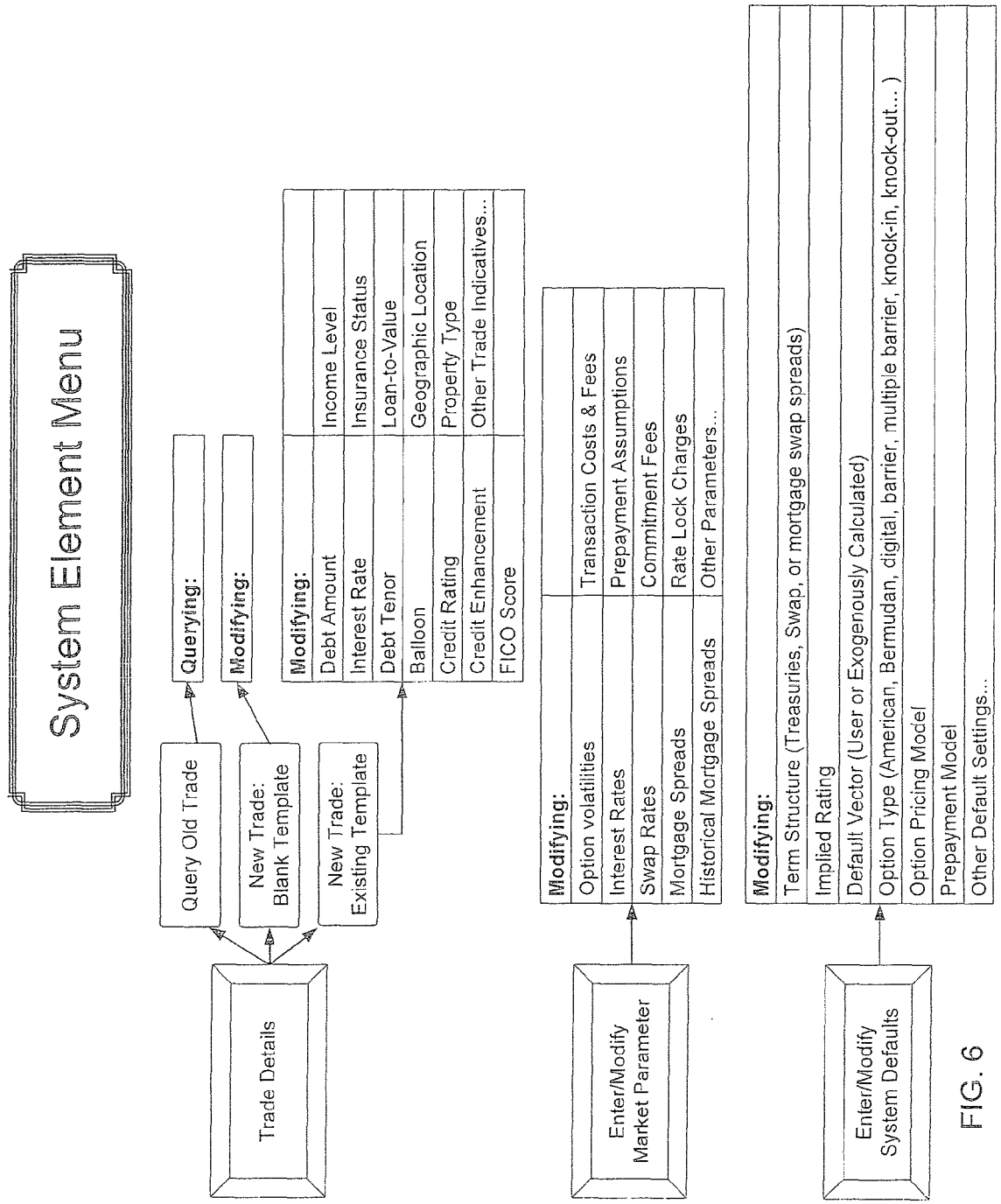
FIG. 6 is an example of a menu for optional functions in FIG. 4.

Users approach a network terminal with a resident GUI and invoke a tabulation of functions as shown in FIGS. 1 and 6. Each function assumes a user point POV as either a debtor or creditor. From the appropriate POV, the user selects a function from a system provided menu. The menu allows a user to: query old trades; invoke a blank template for a new trade; or invoke a template with a prior trade exemplar. Having invoked an exemplar template, the user enters over-ride data into the template to capture the user's desired trade details (block #30). Such desired details may include: debt amount, interest rate, debt tenor, balloon treatment, credit rating, credit enhancement, FICO score, income or other indications of ability to pay, insurance status, loan to value ratio, geographic area or zip code, housing type (block #30, or modification via blocks #160 or #330). In addition to trade details, the user may either accept or reject current market parameters for, inter alias option volatilities, interest rates, swap rates, mortgage spreads, historical mortgage spreads, transaction costs and fees and prepayment assumptions, commitment fees, rate lock charges (block #30 and block #40). The user may accept or override system defaults for the term structure of Treasuries, and/or swaps and/or mortgage swap spreads, and apply a rating-implied, user calculated, or exogenously calculated default vector (block #160). The user may also indicate a desire to structure the debt instrument as a certain option type (e.g., American, Bermudan, digital, barrier, multiple barrier, knock-in, knock-out) and also invoke a related option pricing model (block #50).

Figure 7:
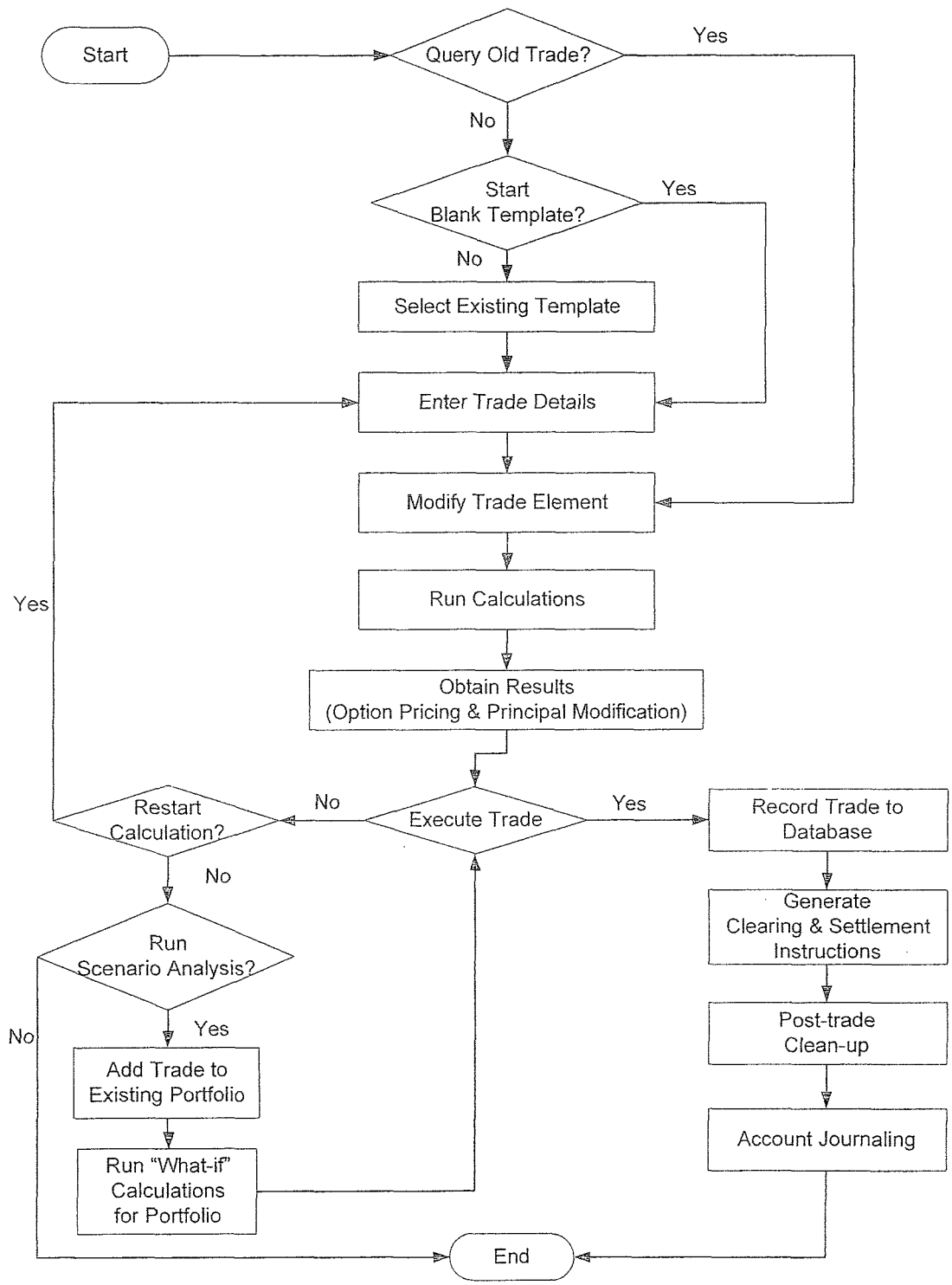
FIG. 7 is a flowchart showing more detail of an aspect of the software of FIG. 1.

Having entered a trade de novo, or having edited a template to specify trade details, the user may commit the trade to the calculation engine (block #110 or block #160). Having committed the trade to calculation, the user may retrieve the final calculation of the pricing of the embedded options (principally, but not limited to, the RPO found in block #180), as well as incremental change (reduction, increase) in the principal indebtedness (block #180). After viewing the calculated output (as well as interim results such as calculated forward rates and volatilities), the user may blend the new trade with a portfolio, for example, to engage in "what if" calculations for portfolio changes such as VaR or stress or correlation, or proceed directly to committing the trade particulars for execution (block #320). Committing the particulars for execution involves: recordation in the trades database (block #330), generation of clearance and settlement instructions, post-trade clean-up of operational particulars (e.g., money movements, cancel, correct, "as of" date) and account journaling (block #310), where block #330 contemplates device output to hard or soft files, as shown further in FIG. 7.

Database Access, Transaction Construction, and Manipulation

Having initiated one or more of the functions described above, the user is coupled, through the GUI, via a communication system with a database (block #330). The database may be queried and then linked with a CPU or blade server for the purpose of calculating partial and full results for the construction or post-construction manipulation of a debt contract (block #300).

In one embodiment, the CPU accepts either database loaded data or user input data in order to calculate a debt structure (blocks #20 and #30). Through an iterative process of data query, data input, data calculation and data output, the user is able to optimize financial arrangements that lead, via debt contract construction, to the implementation of an agreement to transform and exchange the ownership of dollar amounts and interest rates. Upon completion of both initial and subsequent iterations of this query/response cycle (block #180, block #190), the debtor and creditor will have entered into a binding agreement to either a valuation or a revaluation of the contract and also entered into an agreement to and an exchange of funds at both spot time and forward time (block #290). Actual rates or values are transmitted for clearance and settlement (block #310) and transmitted for recordation within a database (block #330). Thus the invention allows the construction of contractual terms as well as methods for completing or realizing the terms of the agreements so constructed via clearance and settlement of dollars and the recordation of future dollar and interest obligations requiring future settlements.

Figure 8:
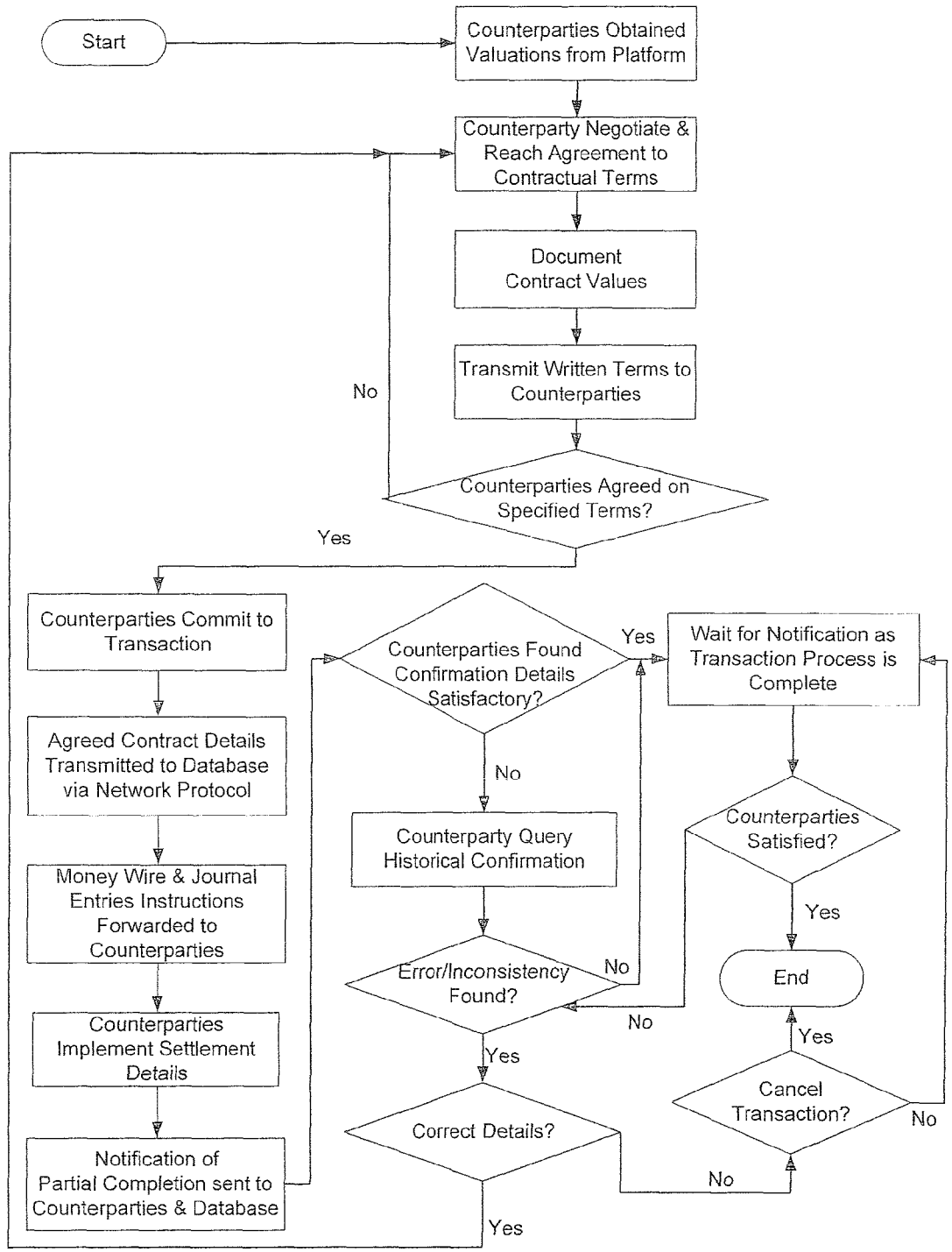
FIG. 8 is a flowchart showing more detail of another aspect of the software of FIG. 1.

Conditional upon an oral agreement to contractual terms between the debtor and creditor, as shown in FIG. 8, a number of consequences ensue subsequent to system invocation: a contract is specified (designed and constructed by multilateral constraints as specified by the parties to the contract) and generated; the terms of the contract are transmitted to the counterparts; the counterparts accept the transaction and "commit" the transaction for processing; the terms of the contract are communicated via network to a database; an automated instruction set is generated in order to move money and to construct journal entries; money wire instructions are forwarded to counterparts; data is written back to the database confirming transaction settlement; the user is messaged as to partial completion at each step of the process; the user is terminal messaged upon process completion; the user may query historical confirmations and/or cancel and/or correct transactions. In contemplation of additional transactions, the database may be queried along indicative lines in order to harvest analytical populations.

Calculations within the CPU

Having invoked either parameter defaults or user entered parameters as described above, users may elect to commit the data to calculation within the CPU/ALU component of the system. Having committed the data to the process of calculation, the user has thereby transmitted the data over a communication network to the core-based processing logic (blocks #110 and 160). The CPU/ALU component of the system accepts the transmitted inputs and begins calculation. Calculations entail generating stochastic cash-flows. Stochastic cash-flows are not deterministic, but are calculated, in a preferred embodiment, as the output of a Monte-Carlo process. Cash-flows are calculated in such a way that nominally deterministic cash-flows are adjusted to take into account contractions or expansions of tenor. Contractions may be due to default or other curtailments; extensions of payments may result from prepayments that are slower than "normal" and/or which reflect modeled amortization schedules at various speeds (blocks #110 and 160). Cash-flows are also subjected to "existence" checks due to the use of an option model that creates contingent existence for a given cash-flow based on the model assumptions and input model parameters invoked by the user (blocks #50-80). The output of the CPU/ALU is in the form of dollars and interest rates as well as various perturbation calculations which express the cash-flow sensitivities as a series of partial derivatives expressed as either spot or future dollars or interest rates (blocks #180-300). The interest rates output include the new spot interest rate for the contract; all forward rates are impounded in the new contracted spot rate (block #180). The dollar quantities output are either increments or decrements to original debt principal (block #180) or sensitivity (block #190) or hedge quantities (block #200, block #210) or financing quantities (block #220).

Figure 9:
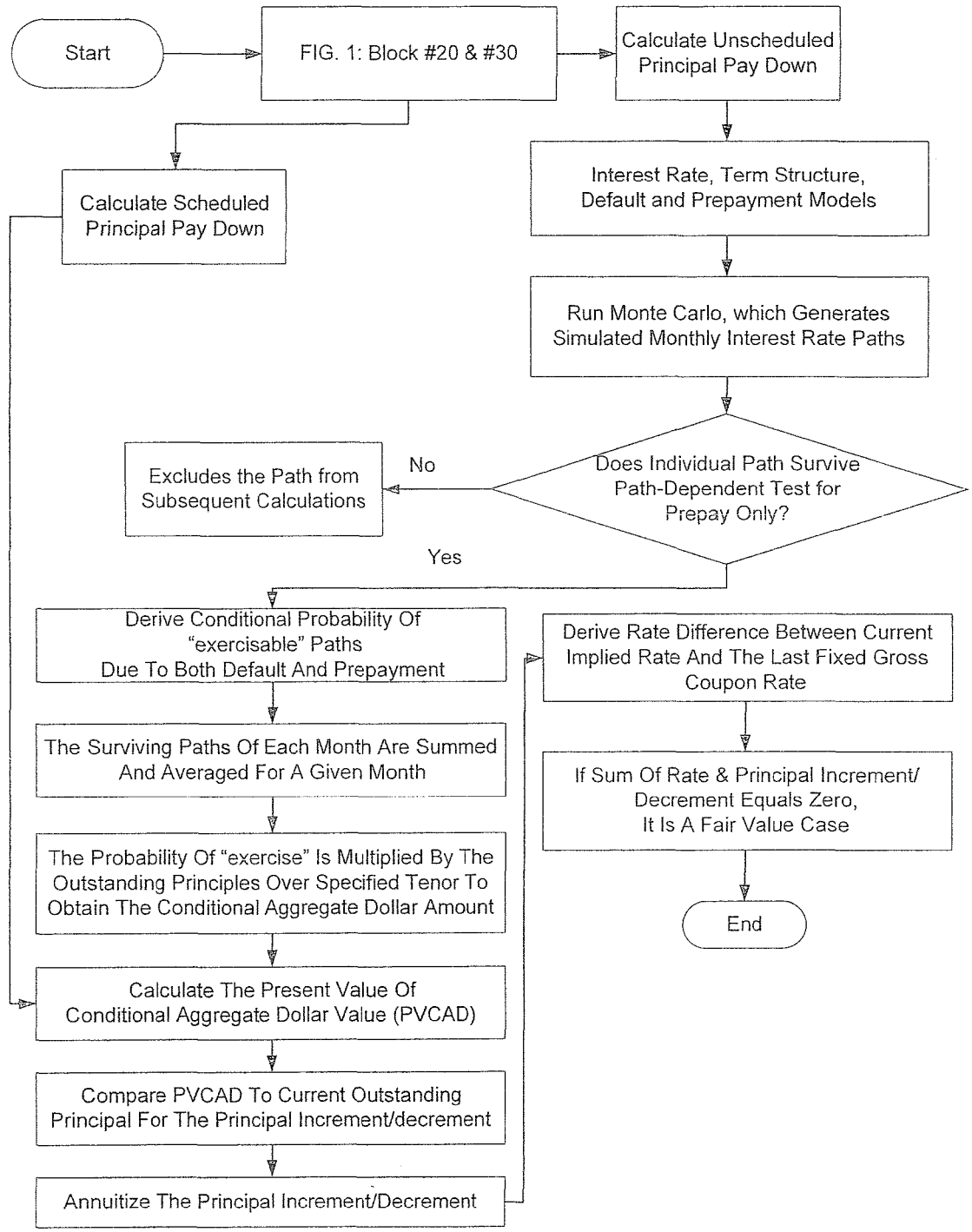
FIG. 9 is a flowchart showing more detail of another aspect of the software of FIG. 1.

The calculation of the principal increment/decrement is based upon the following calculations shown in FIG. 9: an existence probability is calculated for each month's cash-flows. Each month's cash-flow consists of two components: "normal" amortization (i.e., amortization according to a standard principal pay down schedule that those skilled in the art will recognize) and curtailment payments. Curtailment payments in turn are composed of two components: defaults calculated from an exogenously calculated vector of default probabilities/scalars (in the alternative an endogenous calculation may be performed or a pre-calculated vendor vector may be supplied) and probabilistic exercise. Defaults may be exogenously calculated by the user under a standard failure model, or obtained from a vendor such as Advanced Financial Technologies ("AFT") as a default vector; prepayments may be calculated using a standard logit or probit model. The calculation of probabilistic defaults and prepayments are calculated under a Monte-Carlo simulation. The figures derived are calculated over a number of rate paths and are applied to monthly rate paths in order to derive a probability of "exercise" (i.e., a probability of future non-existence based on default, prepayment or other curtailment). The probabilities calculated may represent: normal curtailment, default driven curtailment, a linear combination of curtailment drivers derived from normal or default based conditionality.

The paths for each month are summed and averaged for a given month. The probability of exercise is multiplied in each month (or over other tenors selected by the user) times the principle outstanding in order to derive the increment/decrement to the loan principle. Each probability is a conditional probability where the conditioning depends on no prior exercise or default of the cash-flow at any date prior to the date for which the calculation is performed (i.e, on a path-dependent survival basis). Once calculated on a month-by-month and path-by-path basis, the conditional or contingent dollar amount is discounted. The aggregate amount discounted to time zero is compared to the outstanding loan balance and is annuitized. The annuitized amount is used to derive a rate-spread to the last fixed coupon (which may be fixed either at inception, or by subsequent agreement between the debtor and creditor). In the zero-differential case or fair-value case, the revised coupon (a plus or minus offset to the last fixing) is set equivalent to (from the creditor's POV) the anticipated principal increment/decrement (from the debtor's POV, and relative to the last fixing).

An exemplar of the calculation may be found in applicant's original filing near original paragraph [0125]. That exemplar depicts the presumptive spread attributable to the annuitized optionality as well as the principal decrement that is attributable to the same base calculation.

Figure 10:
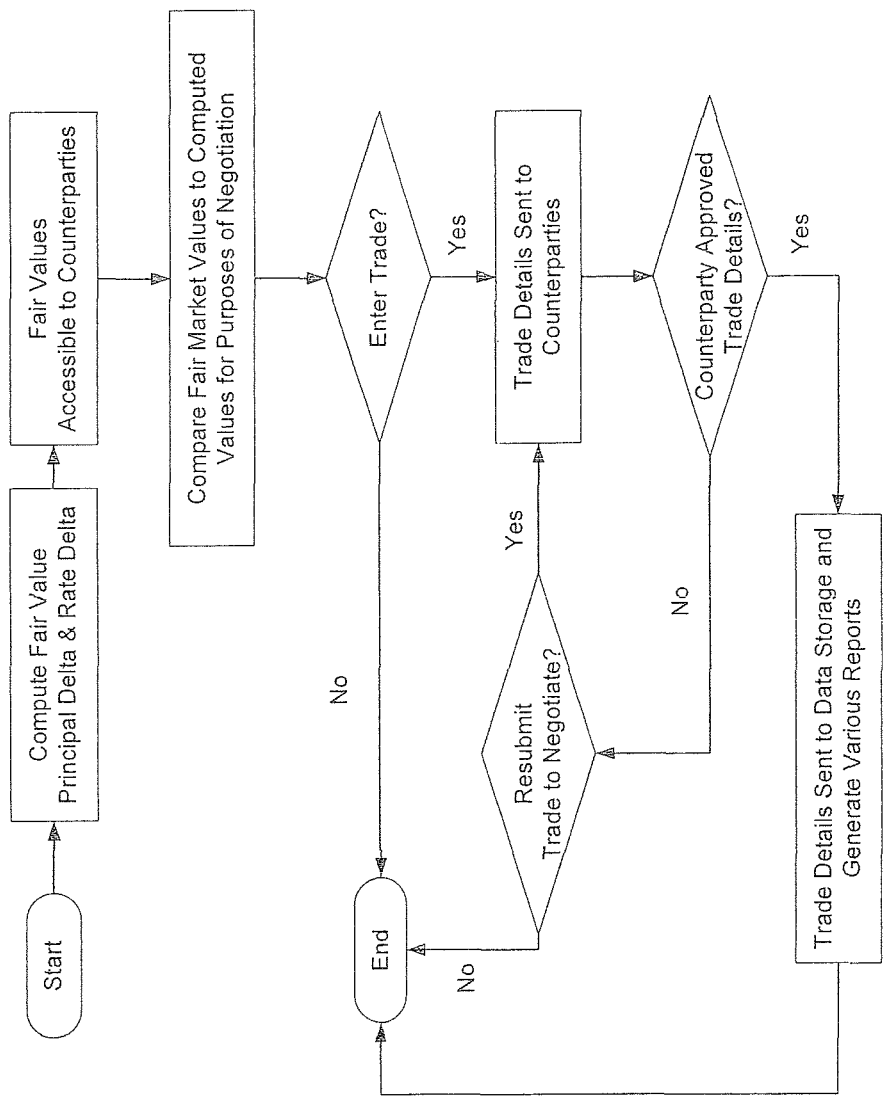
FIG. 10 is a flowchart showing more detail of another aspect of the software of FIG. 1.

The equilibration of the rate and principle change forms a "fair value" trade-off. This fair value is the no-arbitrage level that is fair to both the debtor and creditor. In this context, "fair" means that the interest rate adjustment and the dollar rate adjustment are fungible to both parties. Using fair value as a point of departure, the debtor and creditor may elect to "tilt" the transaction preferentially toward the debtor (in principal space and/or rate space) or preferentially toward the creditor (in rate space and/or principal space). Having negotiated this variance from fair value, both debtor and creditor occupy their "preferred habitat" as to principal change or principal-delta, and rate change or rate-delta. All of these calculations are communicated to debtor and creditor for approval; subsequent to approval, trade details are committed to money clearance (block #310) and transactions repositories (FIG. 1 block #330 and FIG. 10.)

The net result of these calculations is to offer to both debtor and creditor explicitly calculated, constructed and "settled" options (i.e., settled or finalized in money terms) which are not found in the traditional mortgage debt instrument. While such optionality is typically calculated relative to the bonds that are constructed from residential mortgage loans, that optionality is not calculated in such a way as to form a join between the principal and rate spaces as under the applicant's invention and is never explicitly traded at either the constructed-bond level, or the level of the whole loan from which such bonds are generally constructed because there is no such existing tradable market instrument. These options according to the invention help to complete the market space for debt instruments.

Hardware Elements

The number of users of the system is limited only by the number of network connections available and the capacity of the underlying network. As shown in FIG. 2, network connections may be established via, inter alia, Integrated Services Digital Network (ISDN), Digital Subscriber Line (DSL), Asynchronous Transfer mode (ATM), Frame relay or other commonly used protocols. Each user terminal may support Web browsing software with windowing capabilities, as well as tools that may be invoked via various office tool suites such as those provided by Google. Such windowed environments allow multiple instances of application software according to the invention, as well as a non-hierarchical view of such an application. Each networked terminal has access to a common or shared database (block #330) that stores historical parameter values, applicant constructed computer code, transaction histories, "canned" SQL queries, reporting templates, security master, transaction master, customer master and other preformatted instantiations of the program code. Each networked terminal is able to access a computer cluster that may consist of a collection of computer racks holding blade servers. Each blade may contain a number of processing cores. Access to the processing cores may distribute either processing jobs or cash-flow calculations over multiple cores. Users may determine which transactions and which transaction sub-components reside on which cores for the purpose of monitoring and optimizing system performance.

Figure 11:
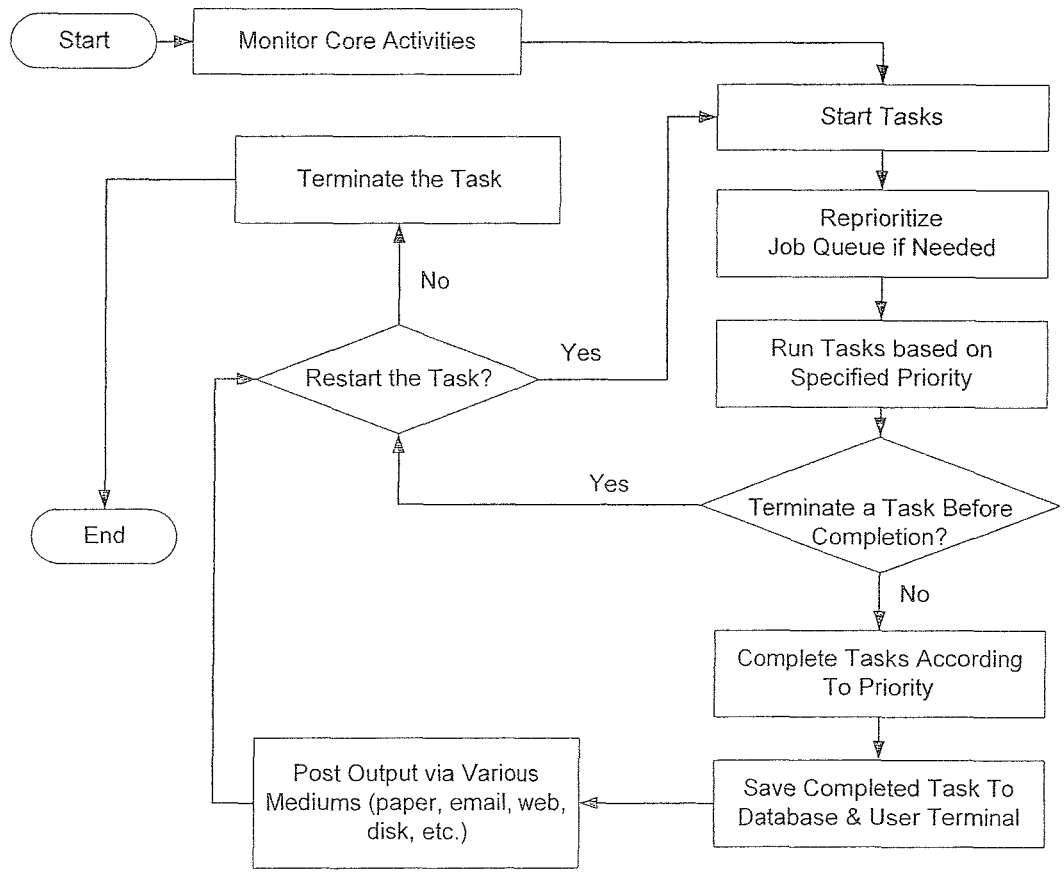
FIG. 11 is a flowchart showing more detail of another aspect of the software of FIG. 1.

As shown in FIG. 11, Users may use real-time visualization to: monitor core activity, ustart or stop jobs, commit completed jobs to the database, print output to an appropriate I/O device. Such devices may be to: paper, a "type" called file or an electronic format, a user terminal, a hosted website, a physical device such as tape or disk drive (block #310). Various aspects of the system will be optimized via special purpose code (e.g., GUI, communications protocols, SQL code), but the calculation kernel of the system will, in a preferred embodiment, be written in C++, while alternate embodiments in Java or Visual Basic may also be implemented.

Storage Media

Figure 12:
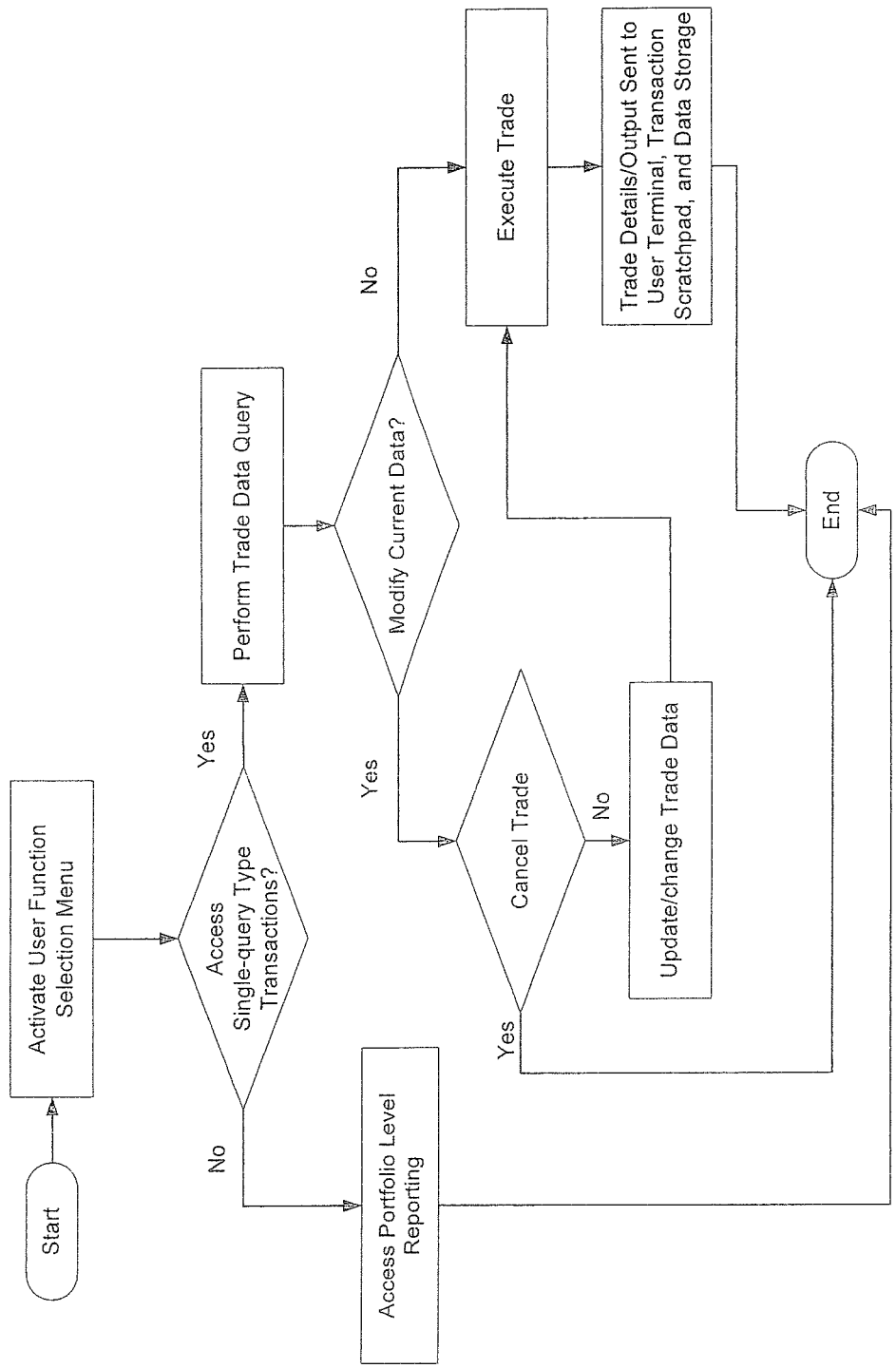
FIG. 12 is a flowchart showing more detail of another aspect of the software of FIG. 1.

All the CPU/ALU output is subsequently reflected in three locations: at the user terminal (block #30), in a transaction "scratchpad" (block #30, block #320), and within a database (block #330). As shown in FIG. 12, subsequent to any transaction, the data may be reflected at the user terminal upon demand. Subsequent to any transaction, the transactions database may be queried and modified via updates, cancels, corrections, or "as of" trades. The above actions are invoked via user function selection from a list of available functions (block #30). In addition to single-query type transactions, users may invoke report generating functionality for the purpose of building portfolio level reporting. In addition to trade level data, such reports and the "canned" SQL queries used to generate them may be stored on the database for future user invocation (block #310). The reports themselves may be generated by user function call, on a timed or automated basis or on an ad hoc basis.

Alternate Technology Embodiments

Users skilled in the art of building and networking computer monitors with processors and databases will recognize that such configurations are almost unlimited in type, present a high-dimensional decision set, and are amenable to a number of optimization solutions.

Application of the System

Figure 13:
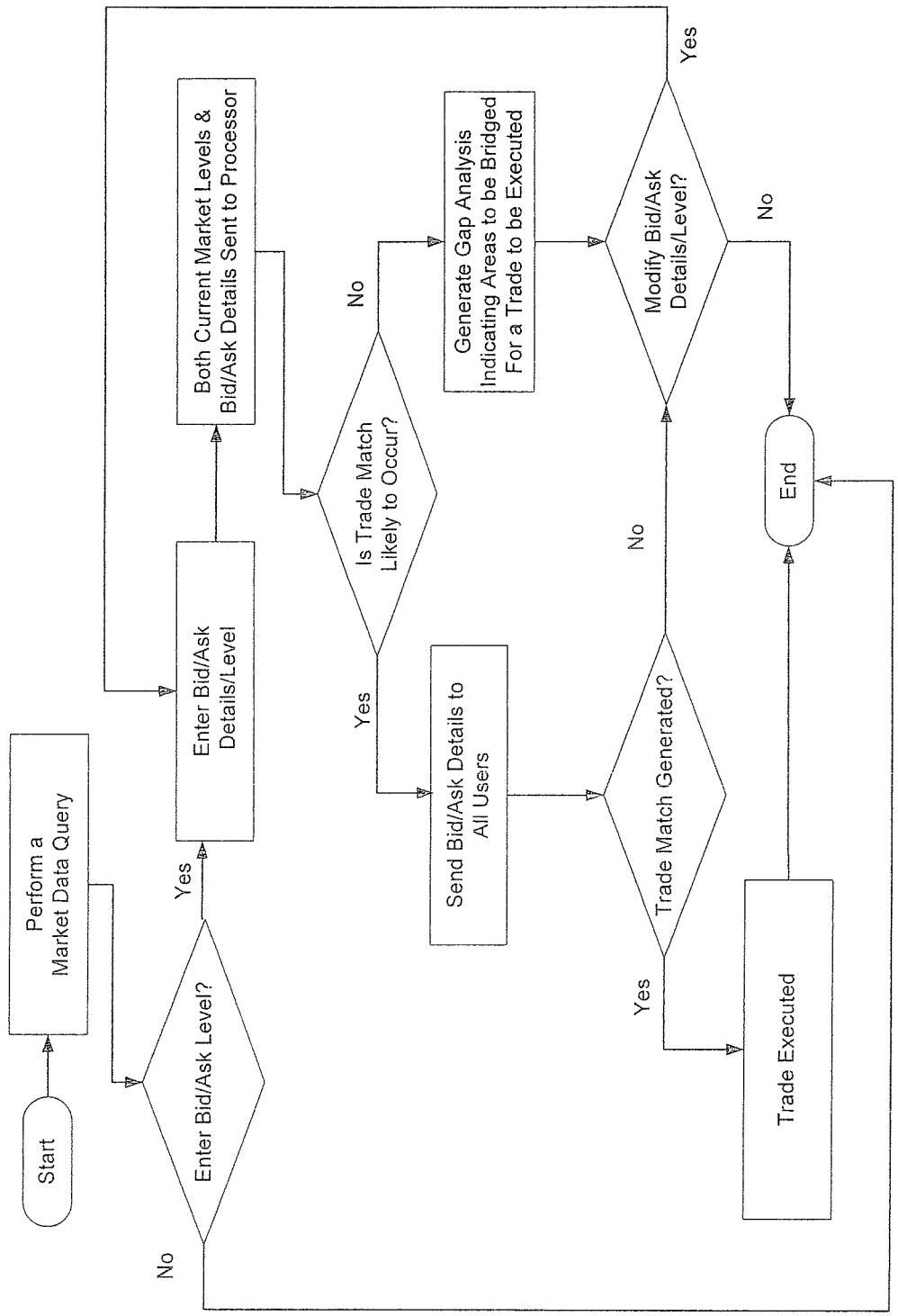
FIG. 13 is a flowchart showing more detail of another aspect of the software of FIG. 1.

The system depicted in FIG. 1 allows either the debtor or creditor to query current market conditions to determine market levels for: interest rates; loan sizes; credit requirements; credit enhancements; collateral requirements; and insurance requirements (block #30). Having queried the state of the market, the user may enter aspirational data representing the constraints to be embodied in a hoped-for transactions, as shown in FIG. 13. The data from the prior two steps (query and data entry) is merged in order to determine whether or not a market-clearing trade is likely to result. If a trade match is likely to result, the users are informed. If no match is likely to result, the users are provided with a gap analysis indicating areas of differences that must be bridged before a trade may be executed. In a preferred embodiment, the user's aspirational data is automatically compared with market based data until a match is found and a trade agreed upon. The above queries require that users from both sides of the market (debtor and creditor) access the above data through a networked terminal that is linked to a communication network, which is further networked with a database and appropriate market-based ticker feeds that source and provide each user with the current state of the market. An automated analysis of the state of the market allows debtors to be matched with creditors based upon each counterpart's desire to receive or to extend credit.

As shown in FIG. 2, the system is contemplated to be a multi-user, multi-location, multi-processor application. Terminals may be invoked by any permissioned user in any location. In a preferred embodiment, user terminals use a standard parent and child protocol for communication. For example the standard TCP/IP over which HTLM or XML or FTP processes are implemented.

Further details of a preferred embodiment in accordance with FIG. 1 will now be provided.

Block #10 represents the beginning of a recursion back into the system's processing flow from the bottom of the system flow upon the assumption that data has previously been entered via block #20, or block #30. In all cases, the operating presumption is that data has previously been stored in a database (e.g., block #90, block #330) via either a networked data-feed, or a user input. Examples of databases that may be used include those provided by Microsoft (e.g., Jet 4.0 Database Engine), Sybase (e.g., 4.0 Database Engine), and Oracle (e.g., Oracle's 11g product). Data feeds might come from systems such as Reuters or Bloomberg. Manual input is entered directly into the system by individual users via appropriate data entry templates as described above.

Data from block #20 is loaded into the system via a networked data feed using an industry standard data transfer protocols (e.g., TCP/IP using HTML, HTTP, or HTML). Those skilled in the art will recognize that databases, networks and transfer protocols are implementation details that are not central to the invention, and that ticker feeds (as well as user input) imply both technical and market judgment considerations. Further, pricing elements include market-derived or market-quoted data fields (e.g., quotations for discounting curves) as well as user provided data fields that are aspirational in nature (e.g., user desired and selected instrument tenor, market-clearing interest rate).

A portion of the data in this block is ultimately reflected in the user interface (discussed below) and partly reflects tick feed data from market sources.

Block #30 data is loaded into the system via user keypunch. Those skilled in the art will recognize that users can replicate (or substitute for) a database call via a manual process. In a preferred embodiment, user input first invokes a graphical user interface or GUI that is menu driven. GUI implementation may utilize any standard object based programming package (e.g., VB.NET). The menu allows a user, among other courses of action, to either create a new transaction, or to invoke an existing template. A new transaction uses a blank template from a prior transaction; an existing template is driven by user-selected deal-type and populated with desired fields, as well as static data from any prior transaction. In addition to prior static or indicative data, ticker feeds are used to populate the market determined portion of the GUI (e.g., discounting curves and spreads).

Figure 14:
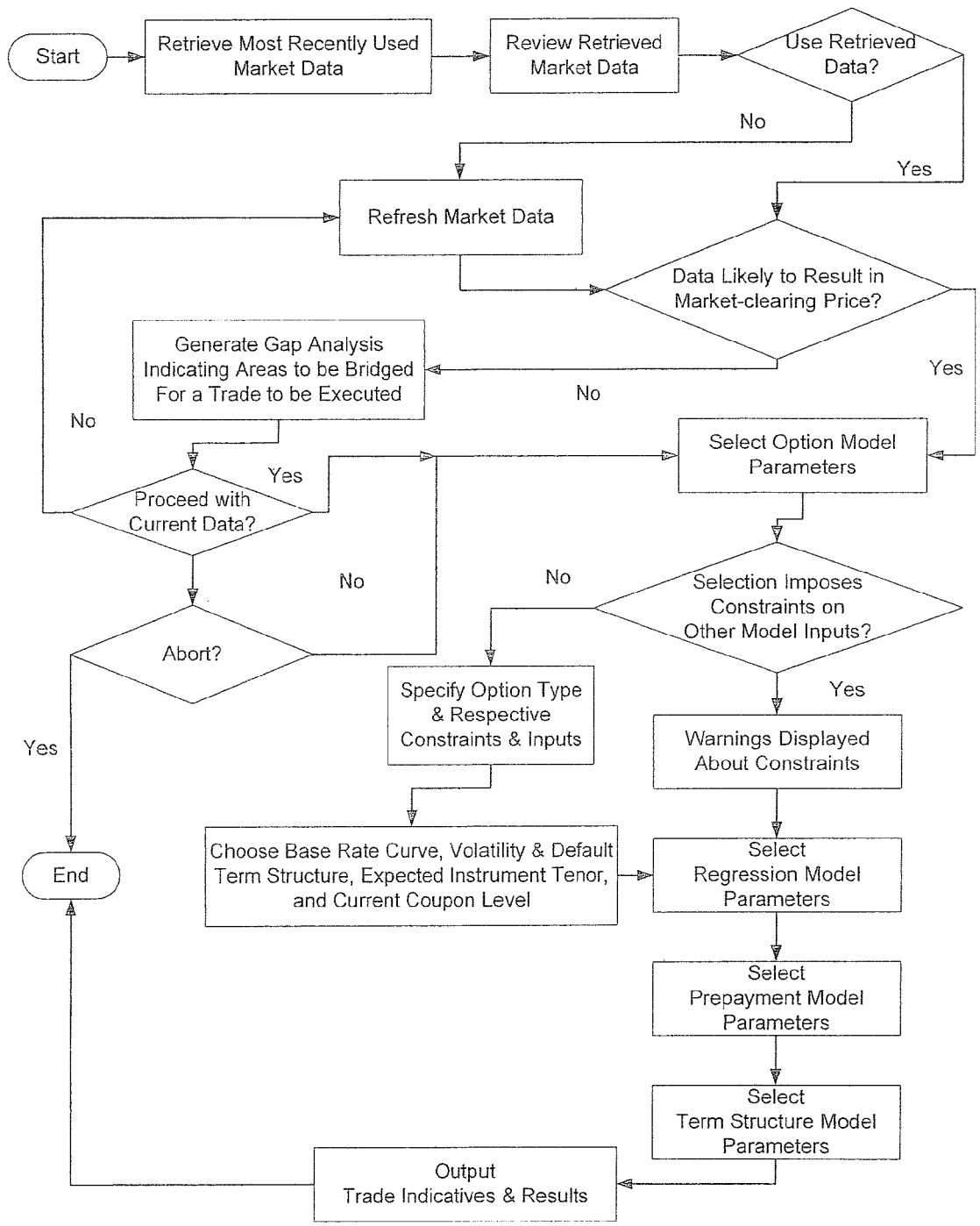
FIG. 14 is a flowchart showing more detail of another aspect of the software of FIG. 1.

Block #40 is a "wrapper" or container for data from block #20 and block #30. As described above, block #40 is a GUI which permits users to access the last state of the "box" and determine whether or not to use the last state for transaction type and market parameters or to refresh the related fields. In addition to the historical state of the market as queried via the database (prior transactions) and the current state of the market (live feeds), a user uses this GUI to enter the material required by blocks #50, #60, #70, #80, as shown further in FIG. 14. These inputs form an intersection between the user's view of market parameter levels (i.e., desired or aspirational parameters), and the market's consensus of the market parameter levels. The parameters entered in these blocks crucially determine, via decision logic incorporated below, whether that intersection will result in a market-clearing price for a debtor/creditor trade or interaction to take place.

Block #50 allows the user, via the aforementioned GUI, to select, inter alia, the option model to be used. The selectable models include, but are not limited to: HJM, BGM (the Brace-Gatarek-Musiela model, also known as the LIBOR market model), Monte-Carlo (representative paths), Monte-Carlo (full). An alternate process would be to invoke, rather than a market standard Monte-Carlo engine, a user-designed or third-party designed Monte-Carlo engine. Selection of the model to be used will impact the inputs selected in blocks, #60, #70, #80, as shown further in FIG. 14. For example, selection of HJM necessarily entails a downstream constraint on the term structure model parameters (block #80). Selection of the form of Monte-Carlo model to be used will constrain the regression (block #60) and prepayment parameters (block #70). To the extent that no constraints result, users are expected to specify: the type of option (e.g., American, Bermudan) and additional constraints imposed by the option type selection. For example, a Bermudan option might be selected with fixed or variable barriers. Users would also be expected to elect a base rate curve, a volatility term structure, a default term structure, an expected instrument tenor, a current coupon level. Those skilled in the art will appreciate that there are dozens of possible option types, dozens of possible option features, and that the input domains for—among other parameters—rates and volatilities have the "power of continuum." For example, the user may select a desired interest rate or volatility between 2% and 10%, but the number of potential choices on that interval is uncountably infinite. The number of possible inputs is multiplicative, thus highly dimensional and is preferably expressed via direct user interaction with the system. User interaction with the model results in a strictly deterministic (i.e., countable in number and defined in magnitude) set of parameters; conditioned on the parameters, a strictly deterministic and repeatable output set is derived. Among other items, a deterministic interest rate and a deterministic principal amount are derived as outputs (block #180).

Block #60 calls for input into a regression of the type generally known as a Tobit model (a logit, probit or other distribution may be modeled and then be specified by the user) that utilizes at least these three parameters: a long-term rate, a mortgage coupon and mortgage seasoning. As in block #50, the function inputs/domain have the power of continuum, but are constrained by market quotations (i.e., the current state of the market will provide the user with an indicative envelope that will contain plausible parameter magnitudes) for, inter alia, interest rates, volatility rates, coupon levels. As in block #40 more generally, input of these parameters may be done at the GUI level (directly in block #40, via sub-blocks #50-#80), or directly in blocks #100, #160, #320, #330, as shown further in FIG. 14. In block #40, such entry may reflect the user's first impression as to market levels; the other blocks reflect entry to: correct errors, override results, perform "what-if" scenarios, or to perform risk analysis. Preferably, the model is tuned on several thousand mortgages. Those skilled in the art will recognize that: 1) there are industry standards for the prepayment utility, and choices might in include, inter alia, the AFT model or the Andy Davidson model; 2) any number of mortgages could be used to tune the model; 3) a generic or user-specified model might alternatively be used. Those skilled in the art will realize that parameter selection is highly individual and may either follow market conventions and magnitudes, or reflect the user's idiosyncratic views and calculations. But embodiments of the invention may accept either a market standard model or a user's idiosyncratic model.

Block #70 functions in a fashion similar to block #60 in that block #60 pre-loads regression outputs into the user interface. As in blocks #100, #160, #310, #320, the user has the opportunity to accept the output of block #60, or to "tune" or override model parameters. Thus while block #40 is an input block, sub-blocks #60, #70 and #80 may be either input that is directly entered by the user, or input that results from a prior output (blocks #100, #160, #320), where decisions are user controlled.

Block #80, analogous to block #70, may represent either a user input, a live feed from, for example, Reuters or Bloomberg, a stored value fetched from a database (e.g., block #330) or a user input from block #320. In a preferred embodiment, this value is a value calculated to be arbitrage-free relative to the underlying Treasury and/or swap curve or other reference or benchmark curves and the spreads to those curves as quoted in the various mortgage or debt submarkets. When specified by the user, this is a direct input (block #30); when calculated to be arbitrage free, this is an input which results from a calculated output (block #20 when from vendor; block #150 when applicant driven).

Block #90 is a security master that summarizes and stores: mainframe data; data feeds from vendors; keypunch data; security indicative data; pre-calculated values for interpolations and surfaces. In short, a physical device loaded with an industry standard database (as dictated in block #330) contains all transaction indicative details. That is, the security master stores all the instrument level generalities related to a given trade. Sub-views of this database can be used to create and store, inter alia the following databases: transaction master, customer master, parameter master. All such related databases are either: generated off of the base master using, for example, MS-SQL or other query language and related database image storing protocols; or accepted into the system via a "side-load" process.

Block #100 is used to ensure data integrity and representation. Normalization is provided for units (e.g., rates in decimal and percent, volatility in a like fashion, notional amounts in dollars). This block uses standard database query and editing tools in order to ensure the consistency of data representations, to provide edit-checks on data, and to maintain database integrity. This block may be accessed directly through native tools in MS-SQL or other language, or through a GUI provided for the user.

Block #110 is a wrapper or container for a series of function calls from blocks #120, #130, #140, #150. As a preview of descriptions which follow below, block #110, uses the input from all predecessor blocks (as described above) in order to invoke block #120.

Block #120 is used to compute the option value for the option type as specified by the user in block #50. As indicated in the description of block #50, selecting an option model and its related parameters is a problem of "high dimension". The major tasks performed in this block include: selection of the desired option model and selection of the desired option-model parameters. In overview, this block depends on function calls to block #130, block #140, block #150, as shown further in FIG. 15.

Figure 15:
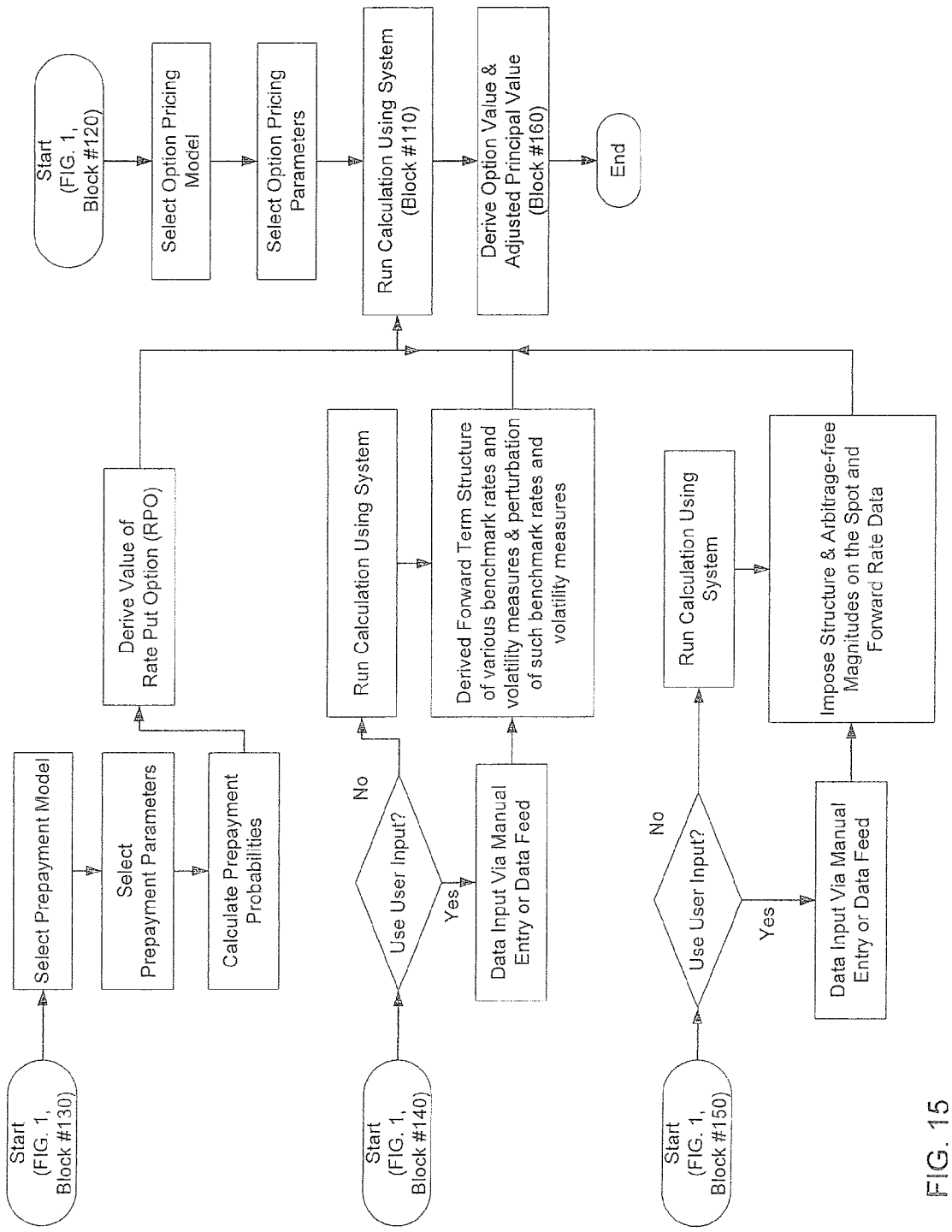
FIG. 15 is a flowchart showing more detail of another aspect of the software of FIG. 1.

Block #130 takes regression model output or user input and calculates prepayment probabilities, as shown further in FIG. 15. Prepayment probabilities may be calculated via a number of industry standard models; in one preferred embodiment, such probabilities are calculated through a user defined process that treats cash-flows as functional outputs rather than as constants. As functional outputs, all cash-flows are assumed to be probabilistic. This probabilistic calculation, in the applicant's is preferably calculated via a full Monte-Carlo simulation. Cash-flows are assumed to be contingent, and are calculated to exist, with some probability. The probable or contingent existence of the future cash-flows is assumed to be a function of, among other factors, interest rate changes and/or a calculated default probability. Default probabilities may be calculated endogenously (blocks #120 through #150 inclusive), or be exogenously supplied by the user as an input vector (block #50, block #60, block #70, block #80). The aggregate probability of conditional cash-flow survival is used to calculate two principal values used in the applicant's structure: the value to the creditor and debtor of changes in interest rates (the value to creditor of a RPO in dollar space; the value of that RPO to the debtor in rate space) and in principal; that is, the value to the creditor and debtor of principal changes and interest rate changes as such changes increase or decrease the probability of cash-flows "existing" or being "knocked in" or "knocked out."

Blocks #140 and #150 are used to calculate the forward term structure of treasuries, swap rates, mortgage swap rates and spreads, rate volatilities, spread volatilities, perturbation on all of the rates and volatilities, as shown further in FIG. 15. In an alternative, such rates and reversion speeds are manually added by the system user in block #30 or block #40. These curves are used to calculate, in an arbitrage-free fashion, the value of the RPO in block #160. Rate reversions and volatilities should be tuned to any existing and related market instruments such as caps and/or floors on the underlying product or as "struck" (i.e., made contingent upon) on related products. Alternatively, this curve may be specified by the user (block #40), or loaded via an external source, or loaded from the security master in block #90 or block #320 ("what if" mode) but is utilized after processes in block #100 and block #160.

Block #150 is implemented in exactly the same fashion as block #140, but is used to impose structure and arbitrage-fee magnitudes on the spot and forward rate data for the discounting curves rather than for the underlying product rate curves, as shown further in FIG. 15.

Block #160 is implemented in order to offer the user straight-through calculations as well as the ability to intervene in the calculation of any of the objects calculated under block #110. At this level, the outputs of block #110 can be reviewed in light of current market clearing levels, and in order to capture errors and/or cancel and correct errors.

Figure 16:
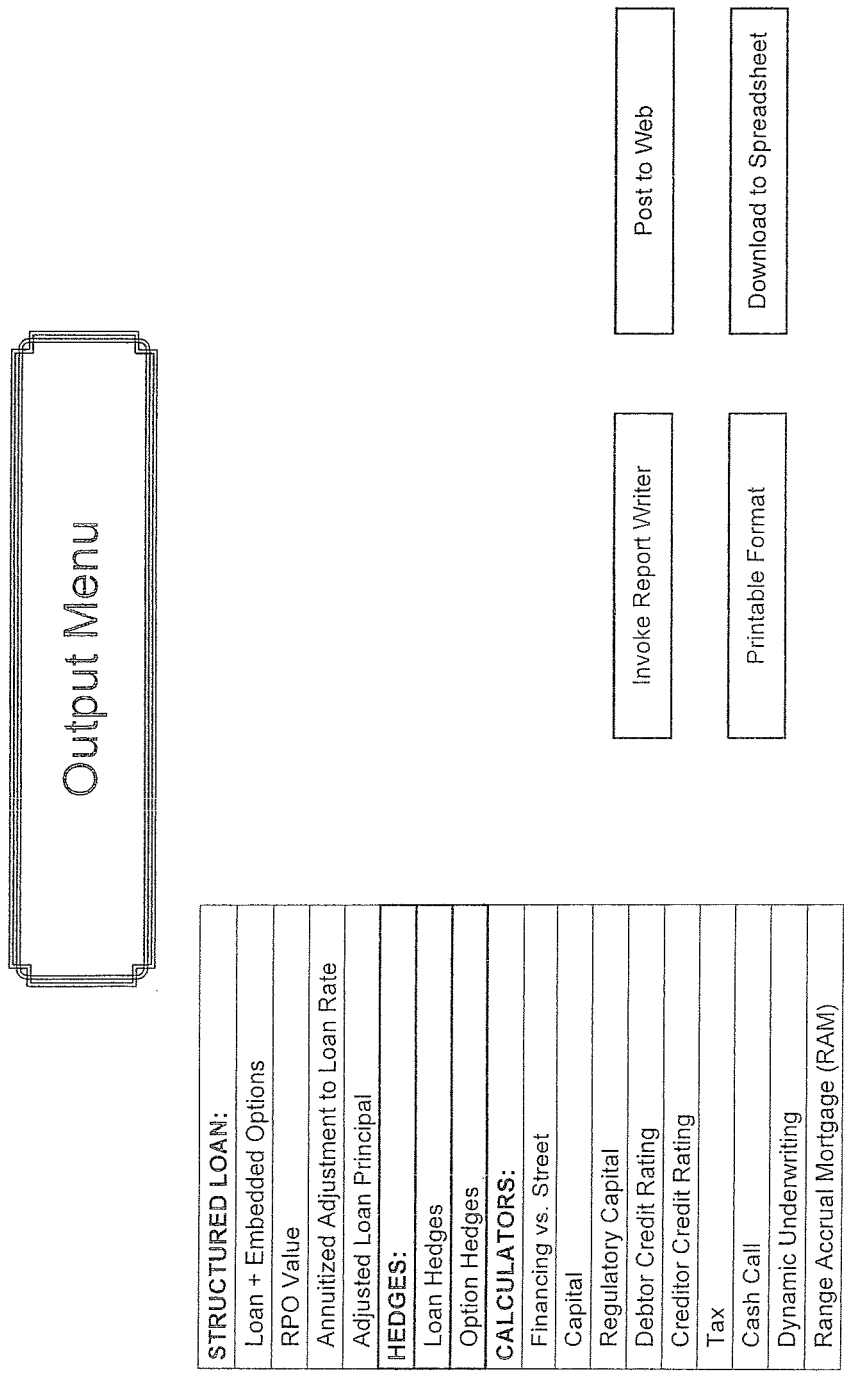
FIG. 16 is an example of an output menu for the software of FIG. 1.

Blocks #170 through #310 inclusive describe and define a generalized reporting framework that those skilled in the art will recognize. The reports in this section may be built and output via: standard SQL language embedded in the subject database as selected by the system architect; via customized Visual Basic programs; alternatively, via an interface which permits interaction with a proprietary report-writer such as Business Objects or Crystal, as shown further in FIG. 16.

Figure 17:
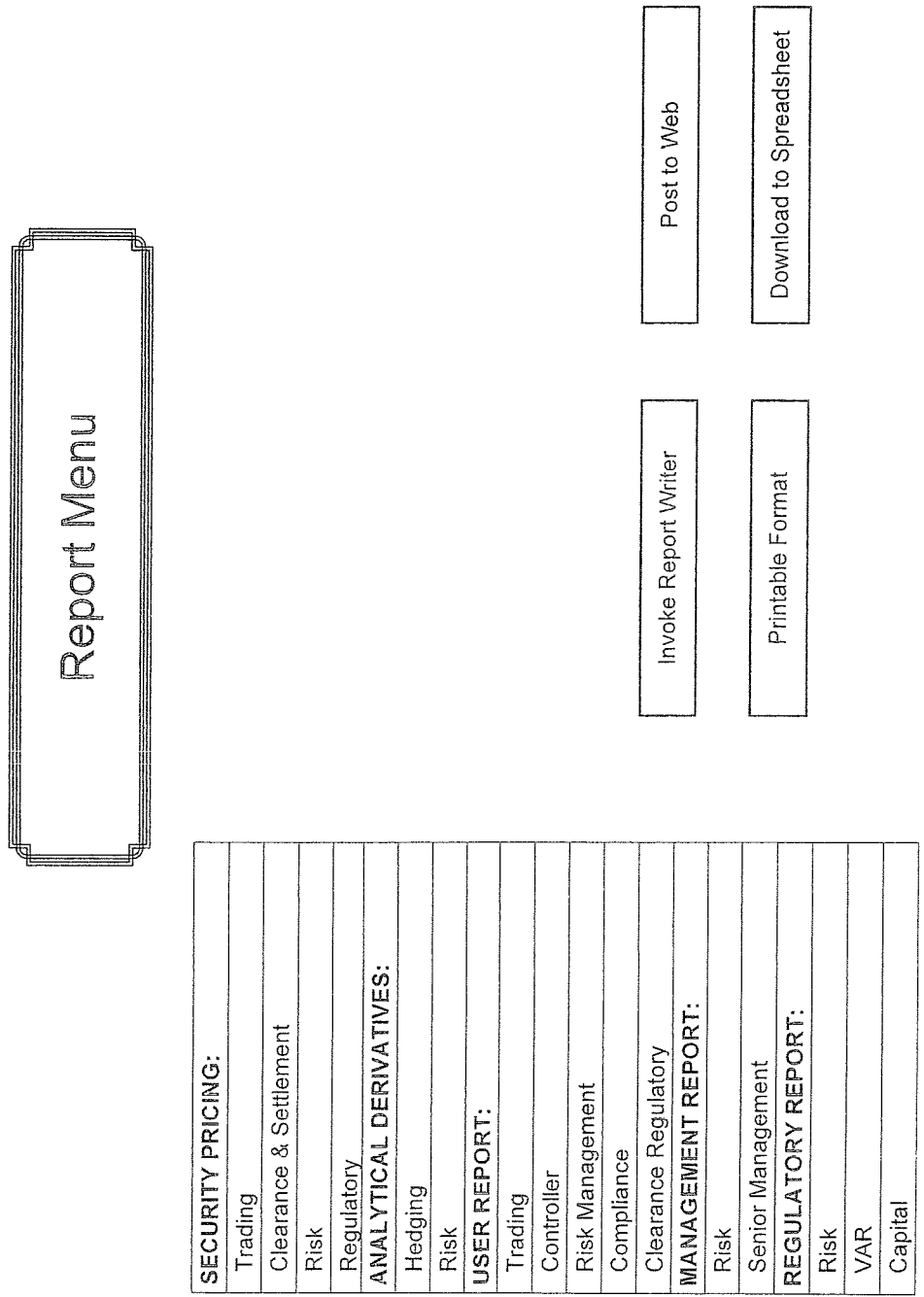
FIG. 17 is an example of a report menu for the software of FIG. 1.

As those skilled in the art will recognize, Block #310 provides the basic management reporting framework for portfolio level analysis where a portfolio consists of one or more instruments or positions. The reports generated there from include, but are not limited to: 1) User Reports (trading desk, control, risk, compliance, clearance regulatory); 2) Securities Prices (trading, clearance, risk, regulatory); 3) Analytical Derivatives (hedging, risk); 4) Management Reports (risk control, senior management); 5) Regulatory Reports (risk, capital, VaR). Thus while a "portfolio" of one or more instrument may be reviewed, this block provides a customizable GUI and a reporting interface for historical analysis, and/or real-time monitoring, as shown further in FIG. 17.

Figure 18:
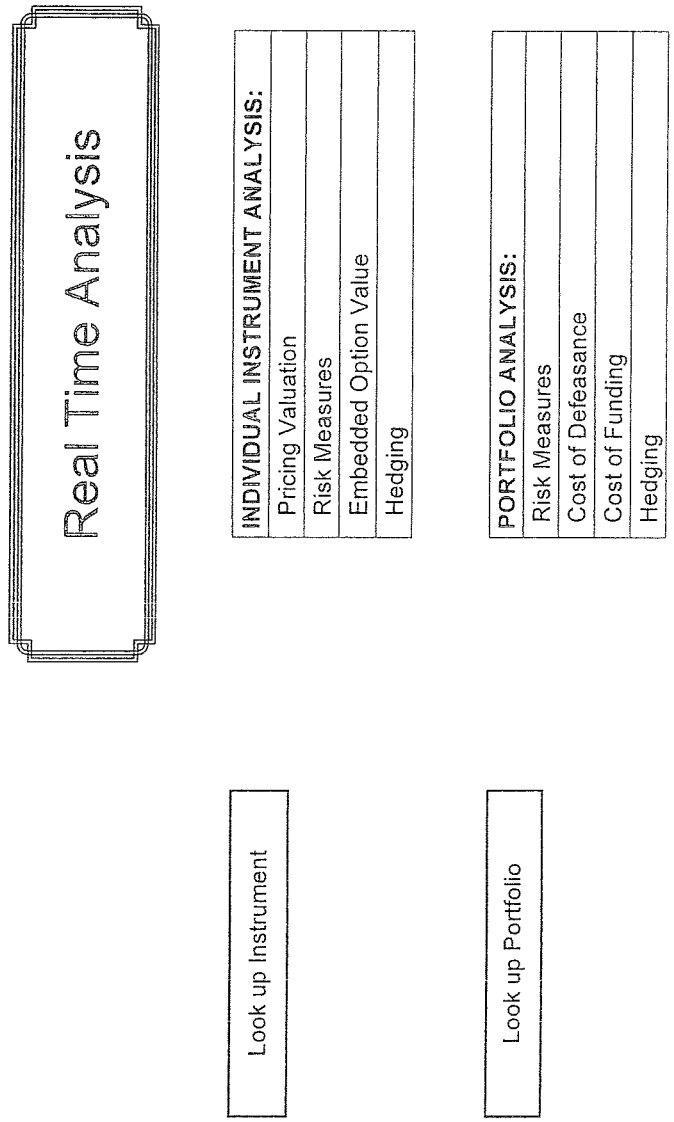
FIG. 18 is an example of a real time analysis menu for the software of FIG. 1.

Block #320 is used for real-time analysis to answer, inter alia, the following questions: What are instrument valuations (the mortgage inclusive of the embedded options as well as without the embedded options as well as the option values on a stand-alone basis)? What is the risk exposure of the portfolio to key rate durations or other risk measure? What is the cost of defeasing the entire portfolio? What are funding costs? What are the optimal hedging instruments and quantities? These tools are operationalized through a user terminal via a GUI. The GUI allows networked communication to the database, to data feeds, or either live or live and hypothetical trades. The GUI allows: portfolio identification, identification of one or more risk metrics, a database fetch from block #330 or a user input from block #30 or block #40 or block #160, user triggered processing under block #110 or block #320, as shown further in FIG. 18.

Figure 19:
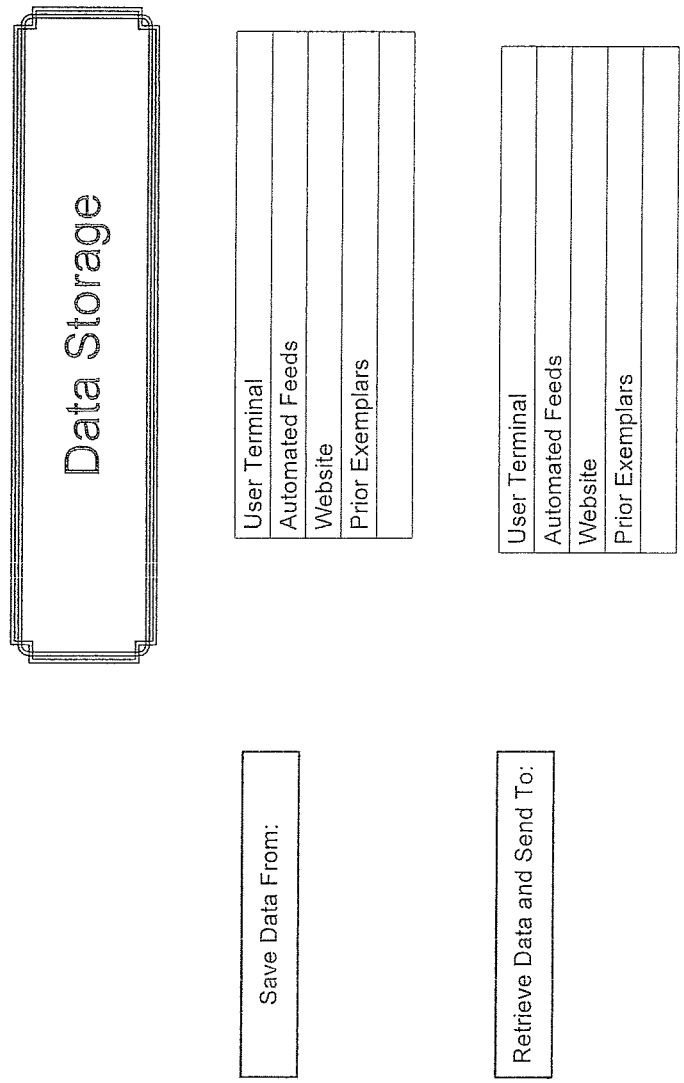
FIG. 19 is an example of a data storage menu for the software of FIG. 1.

Block #330 stores data from users, from automated feeds, from prior exemplars of the database after trades have been committed to the transaction and processing stream, or from the entry of hypothetical trades. This data storage is network enabled to either "pull" data, as stated, or to "push" data to users via direct display on a networked terminal, or to push data to users via a networked and automated general ledger system, or via network to a money clearance system, as shown further in FIG. 19.

The net result of blocks #10 through #330 inclusive are to allow the user to implement the applicant's novel calculations for the creation of a structured debt security. The security thus structured helps to complete the market and offers users a novel financial transaction which transforms spot dollars and interest rates into forward dollars and interest rates.

Embedding the RPO in Interest-Bearing Borrowings (Another Embodiment)

Another embodiment of the invention uses a conventional interest bearing borrowing that is written at the current or the spot market level of interest. By market convention (rather than through an explicitly documented right), the borrowing may be retired by the debtor at any time: it is callable. In this embodiment, embedded in the instrument is the additional right of the debtor to sell a put option on a market interest rate—an RPO—to the creditor. The RPO sold by the debtor to the creditor may be an interest rate different from that which existed at the date of issuance as well as, potentially, the sale of a put on the entire term structure of interest rates for the appropriate market(s).

In this embodiment, the resulting "package" consists of:
the sale by the debtor to the creditor of a mortgage or other evidence of borrowing in exchange for cash;
the sale by the creditor to debtor of a call option to repay the borrowing early relative to the original nominal maturity;
the sale by debtor to the creditor of a put option on the market interest rate, as well as, potentially, the entire forward term structure of interest rates for the appropriate market(s) (the RPO); and
upon sale, the debtor receives the value of the RPO (which could be a one-time payment or an annuitized change to his borrowing rate, among other possibilities) as well as the right to have his principal borrowing correlatively adjusted to reflect his absorption of the new current (as well as, possibly, forward) levels of market interest rates.

The value of this above package may be dynamically calculated (at both spot and forward times) such that:
the debtor pays an initial stated level of interest to the creditor;
the debtor has the option to retire the borrowing, in whole or in part, at any time;
the debtor sells to the creditor an RPO which may cause the debtor to pay, in the future, an interest rate which may be higher than the interest payable at the instrument's inception;
in consideration of the RPO sold to the creditor, the debtor receives an adjustment to the principal of his borrowing. As noted above, this adjustment is more calculationally sophisticated than a simple rate-spread mark to market;

In this embodiment, the interest-bearing instrument is implemented via explicit permutations in the embedded option structure relative to:
the remaining nominal tenor,
the remaining nominal principal,
the principal and interest payments, and
the interest level imposed by the original obligation.

Adjustments to parameters used to model the RPO may include:
forward term structures of interest rates;
forward prepayments;
forward option prices; and
forward collateral prices.

In this embodiment, among the options available to implement the interest-bearing instrument are:
the calculation of the value of the options package attached to the borrowing may start at contract inception, or in the future (spot or forward starting options);
the options package may consist of options that may be exercised on a daily basis, or on the basis of any other temporal calculation; exercise dates may be:
American (continuously exercisable);
European (exercisable at maturity only);
Bermudan (exercisable at selected interim dates between inception and maturity); or
any combination of the above;
the options package may calculate interest implementation levels on either a discrete or continuous basis (strike prices may be continuous, discrete, or averaged);
option exercise may be based on hitting: a prescribed strike level, a barrier level or range created by multiple barrier levels, a spread indicative of over- or under-performance relative to a single instrument, or a basket of instruments;
the "knock-in" of certain option components may "knock-out" certain other related option components;
the "knock-out" of certain option components may "knock-in" certain other related option components;
the nature of the option may entail the calculation of a payout envelope created by the exchange of one asset exchanged for another;
options may be exercised by the holder through a "shout" where the holder declares the holder's desire to fix a strike or exercise level, or the maximum or minimum of a state-variable (whether a model input or model output) based upon the holder's best estimation of the possible evolution of the forward state-variable processes relative to the historical evolution of those processes over the already expired life;
exercise of options may be on a fixed, floating, or average strike;
option payout structures may be linear or non-linear, annuitized or lump-sum, paid at spot or deferred in settlement, paid in dollars, in foreign currency, or in-kind;
for any or all of the above calculations, the calculation may be done in any mathematical basis selected by either party to the transaction;
the option structure may be formed by a linear, or non-linear aggregation of the foregoing options; or by any other portfolio combination or basket of any of the foregoing variants of option; or through synthetic replication; and option volatility, as well as other parametric inputs into
  the option model,
  the rate diffusion process,
  the prepayment model, or
  any other calculational building block,
may be stated on any basis of compounding or tenor, and may be calculated with any model, including, but not limited to: any generalized term structure or multi-factor model, ARCH, GARCH, IGARCH, or EGARCH.

For any system or method according to the present invention, pricing and capturing the value of a financial entities' regulatory capital savings is preferably done using the following equation:

$$RCS_t = \left(\sum_{i=1}^{i=T} \left(\left((L_{u_a} - L_R)_i * RCW * RCP * R_{k_i} / F\right) * (1 + \overline{R}_{f_i}/F)^{-i} / L_{u_{a_i}}\right)\right) * 10{,}000 \qquad (10)$$

where:

| Symbol | Interpretation | Exemplary Value |
|---|---|---|
| RCS | Risk Capital Savings | Output |
| $L_{u_a}$ | Unamortized Loan Balance: Monthly | Amortized Loan |
| $L_R$ | Unamortized Loan Balance: RAM variant (contains principal modifiction) | Variable: amortizes and impacted by option |
| RCW | Risk Capital Weight | 50% of notional by assumption |
| RCP | Risk Capital Percentage | 8% capital set-aside by assumption |
| $R_k$ | Contract Rate Discount Factor | 5% by assumption |
| $\overline{R}_{f_t}$ | Strike Rate Discount Factor | 8% by assumption |
| F | Periodicity | 12/yr or monthly |
| $L_{u_a}$ | Unamortized Loan Balance: Monthly | Amortized Loan |

Those skilled in the art will recognize that the foregoing embodiments and examples are only suggestive of, and do not limit, the possible underlying building blocks for an embodiment of the invention. As to any possible structure in accordance with the present invention, what is most preferable is that:

the borrowing be structured so that its sensitivity to, inter alia, interest rate changes, volatility changes, prepayment parameter or other model changes, allow the debtor and creditor to agree upon any possible combination or permutation of principal and interest to be paid, and the timing thereof;

the borrowing be structured so that the extension risk and credit risk typically found in borrowings that carry off-market coupons in a changing rate environment be completely subject to the creditor's and debtor's control; and any implied options in the subject market be made explicit, be priced, and be used to control the rate, principal size, payment timing of the underlying obligation, and/or any other relevant parameter of the instrument so constructed;

any explicit options be priced under conditions of parity relative to any implied options; and any implicit options be priced under conditions of parity relative to any explicit options.

A nonexclusive list of financial instruments that may be implemented using the present invention is as follows:

mortgages, including residential (such as for a house, condominium, cooperative unit, or any domicile regardless of form) and commercial (such as government-sponsored enterprise (GSE) loans (where the government may be federal, state, municipal, foreign, or otherwise, and where the GSE may a supranational agency such as the World Bank or other entities sponsored in whole or in part by one or more governments), mixed use, education loans, educational institution offering or a subset thereof, land trust for conservation or public purposes, religious financing structure (where no interest may be stated explicitly), and personal equity lines of credit for any purpose);

automobile loans, including equipment or equipment trust certificates, obligations arising out of a restructuring or change of corporate control, shipping entities (such as naval vessels, aircraft, spacecraft, cars, trucks, and trains), Internet entities, general-purpose corporate loans, collateralized loan obligations/collateralized bond obligations (CLOs/CBOs) military equipment, and consumer finance for durable goods (such as refrigerators, televisions, audio or video equipment, etc.);

deferred payment contracts, such as insurance policies, whether one-time payment or annuitized; and leases, leveraged or otherwise, for the purchase of any goods or services, including any of the goods, services, and instruments described herein.

In addition, financial instruments according to the invention may be for one-time payment or annuitized; may involve sale of the entire spot-forward and/or forward-forward curves; may include adjustment of any model parameter or calculational component described in this specification or apparent to skilled artisans; or may be constructed with any set of instruments that may be used to construct an instrument via parity.

The scope of the present invention is defined by the claims and is not to be limited by the specific embodiments and examples described in this specification. Various modifications of the invention in addition to those described will be apparent to those skilled in the art from the foregoing description and accompanying figures. Such modifications are intended to come within the scope of the claims.

What is claimed is:

1. A computer-implemented apparatus for facilitating issuance of an interest-bearing instrument, comprising:
   a memory; and
   a computer processor in communication with the memory, the computer processor executing functions comprising:
   (a) receiving data corresponding to market factors;
   (b) storing the received market factors data in a database;
   (c) selecting an option model;
   (d) receiving data corresponding to a regression model;
   (e) receiving data corresponding to a prepayment model;
   (f) receiving data corresponding to an interest rate term structure model;
   (g) receiving data corresponding to a default term structure;

(h) receiving data corresponding to transaction indicative details associated with the interest bearing instrument to be issued;
(i) normalizing the received and stored data;
(j) calculating prepayment probabilities based on an output of the regression model and an output of the prepayment model;
(k) calculating a forward term structure of at least one benchmark rate based on the interest rate term structure model;
(l) calculating discount factors to be applied to at least one cashflow associated with the interest bearing instrument to be issued;
(m) calculating an option value from the option model using the prepayment probabilities, the forward term structure, the discount factors, and the default term structure;
(n) calculating a principal modification value based on the option value, wherein the principal modification value modifies a principal amount associated with the interest bearing instrument to be issued;
(o) calculating a risk capital savings using the following equation:

$$RCS_t = \left( \sum_{i=1}^{i=T} \left( ((L_{u_a} - L_R)_i * RCW * RCP * R_{k_i} / F) * (1 + \overline{R}_{f_i} / F)^{-i} / L_{u_{a_i}} \right) \right) * 10000$$

where:
RCS is Risk Capital Savings;
$L_{u_a}$ is unamortized Loan Balance: Monthly;
$L_R$ Loan: Rate Accrual Mortgage variant (which contains the principal modification value);
RCW is Risk Capital Weight;
RCP Risk Capital Percentage;
$R_k$ is Contract Rate Discount Factor;
$\overline{R}_f$ is Strike Rate Discount Factor;
F is Periodicity;
i is an incremental counter;
t is an initial time; and
T is a final time; and
(p) displaying the calculated risk capital savings to facilitate issuance of the interest bearing instrument.

2. The apparatus of claim 1, wherein the computer processor further executes functions for receiving user input and, based on the user input, changing the calculated option value, or the calculated principal modification value, or both.

3. The apparatus of claim 1, wherein the computer processor further executes at least one function for outputting real-time data related to any of the calculations.

4. The apparatus of claim 1, wherein the market factors data is received from user input, or a networked data feed, or both.

5. The apparatus of claim 1, wherein calculating the forward term structure is done using a Monte Carlo simulation.

6. The apparatus of claim 1, wherein the option model is a Heath-Jarrow-Morton model.

7. The apparatus of claim 1, wherein the option model is a Brace-Gatarek-Musiela model.

8. The apparatus of claim 1, wherein the regression model is based on a Tobit model.

9. The apparatus of claim 1, wherein the regression model is based on a logit model.

10. The apparatus of claim 1, wherein the regression model is based on a probit model.

11. The apparatus of claim 1, wherein the prepayment model is based on an Andy Davidson model.

12. The apparatus of claim 1, wherein the prepayment model is based on an Advanced Financial Technologies model.

* * * * *